(12) United States Patent
Chandler-Page et al.

(10) Patent No.: US 12,039,090 B2
(45) Date of Patent: *Jul. 16, 2024

(54) INTEGRATED CIRCUIT WITH ASYMMETRIC ACCESS PRIVILEGES

(71) Applicant: Cirrus Logic International Semiconductor Ltd., Edinburgh (GB)

(72) Inventors: Michael Chandler-Page, Newbury (GB); Pradeep Saminathan, Edinburgh (GB); Jon Eklund, Austin, TX (US); Neil Whyte, Edinburgh (GB); José Arnaldo Bianco Filho, Edinburgh (GB); Abhinav Sharma, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/394,014

(22) Filed: Aug. 4, 2021

(65) Prior Publication Data

US 2022/0229937 A1 Jul. 21, 2022

Related U.S. Application Data

(63) Continuation-in-part of application No. 17/232,514, filed on Apr. 16, 2021, now Pat. No. 11,809,334.

(Continued)

(30) Foreign Application Priority Data

Apr. 30, 2021 (GB) ..................... 2106226

(51) Int. Cl.
*G06F 12/14* (2006.01)
*G06F 9/4401* (2018.01)
(Continued)

(52) U.S. Cl.
CPC ............ *G06F 21/71* (2013.01); *G06F 9/4406* (2013.01); *G06F 12/1441* (2013.01);
(Continued)

(58) Field of Classification Search
CPC ............. G06F 13/1663; G06F 12/1441; G06F 2212/1052
(Continued)

(56) References Cited

U.S. PATENT DOCUMENTS 5,737,760 A 4/1998 Grimmer, Jr. et al.
6,510,522 B1 1/2003 Heinrich et al.
(Continued)

FOREIGN PATENT DOCUMENTS

CN 103198246 A 7/2013
EP 3425551 A 1/2019
(Continued)

OTHER PUBLICATIONS

Combined Search and Examination Report under Sections 17 and 18(3), UKIPO, Application No. GB2205910.9, dated May 5, 2022.
(Continued)

*Primary Examiner* — Arpan P. Savla
*Assistant Examiner* — Sidney Li
(74) *Attorney, Agent, or Firm* — Jackson Walker L.L.P.

(57) ABSTRACT

An integrated circuit comprises first and second interfaces, an internal addressable space comprising a plurality of address ranges, and a control unit. Each of the first and second interfaces is coupled to the internal addressable space via the control unit. The control unit is configurable in a first state in which the control unit is configured to allow or deny the second interface access to a subset of the plurality of address ranges of the internal addressable space.

22 Claims, 16 Drawing Sheets

Related U.S. Application Data

(60) Provisional application No. 63/138,950, filed on Jan. 19, 2021.

(51) Int. Cl.
  G06F 13/16 (2006.01)
  G06F 21/71 (2013.01)
  G06F 21/60 (2013.01)
  G06F 21/62 (2013.01)
  G06F 21/74 (2013.01)
  G06F 21/76 (2013.01)
  G06F 21/85 (2013.01)

(52) U.S. Cl.
  CPC .......... *G06F 13/1663* (2013.01); *G06F 21/76* (2013.01); *G06F 2212/1052* (2013.01)

(58) Field of Classification Search
  USPC ........................................................ 711/163
  See application file for complete search history.

(56) References Cited

U.S. PATENT DOCUMENTS

| | | | |
|---|---|---|---|
| 10,810,036 B1* | 10/2020 | Harland | G06F 13/364 |
| 2005/0033982 A1* | 2/2005 | Paaske | G06F 21/552 |
| | | | 726/27 |
| 2005/0172073 A1* | 8/2005 | Voigt | G06F 3/0635 |
| | | | 711/114 |
| 2005/0242924 A1 | 11/2005 | Yosim et al. | |
| 2008/0263256 A1 | 10/2008 | Gudeth et al. | |
| 2009/0164961 A1 | 6/2009 | Goss et al. | |
| 2010/0017893 A1 | 1/2010 | Foley et al. | |
| 2012/0215989 A1* | 8/2012 | Moyer | G06F 12/1416 |
| | | | 711/E12.091 |
| 2013/0304958 A1 | 11/2013 | Schoenfeldt et al. | |
| 2014/0156961 A1 | 6/2014 | Hadley | |
| 2014/0359186 A1 | 12/2014 | Helmschmidt et al. | |
| 2014/0372653 A1 | 12/2014 | Hsieh et al. | |
| 2015/0207624 A1* | 7/2015 | Laver | H04L 9/0894 |
| | | | 713/189 |
| 2017/0228326 A1 | 8/2017 | Depeyrot et al. | |
| 2019/0042766 A1 | 2/2019 | Pappachan et al. | |
| 2020/0213115 A1 | 7/2020 | Mathane | |
| 2021/0232510 A1* | 7/2021 | Ndu | G06F 21/44 |

FOREIGN PATENT DOCUMENTS

| | | |
|---|---|---|
| WO | 2018104711 A1 | 6/2018 |
| WO | 2020005453 A1 | 1/2020 |

OTHER PUBLICATIONS

Search Report under Section 17, UKIPO, Application No. GB2205913.3, dated May 5, 2022.
Combined Search and Examination Report under Sections 17 and 18(3), UKIPO, Application No. GB2106226.0, dated Jan. 26, 2022.
Google Search, https://www.google.com/search?q=define+integrated+circuit (Year 2022).
Anysilicon, https://anysilicone.com/what-is-a-system-on-chip-soc/ (Year 2022).
Combined Search and Examination Report under Sections 17 and 18(3), UKIPO, Application No. GB2111251.1, dated Dec. 23, 2021.
Written Opinion of the International Preliminary Examining Authority, International Application No. PCT/GB2021/052016, dated Dec. 8, 2021.
International Search Report and Written Opinion of the International Searching Authority, International Application No. PCT/GB2021/052016, dated Oct. 18, 2021.

* cited by examiner

Figure 1 – Prior Art

|  | Boot Access to IC Registers | Runtime Access to IC Registers |
|---|---|---|
| Prior Art IC | Yes – to all spaces via single control interface | No |
| Current IC | Yes – to all spaces via first control interface | Yes – to a subset of authorised spaces via second control interface |

Figure 4

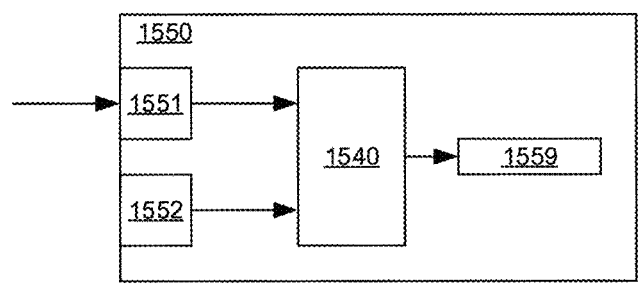
Figure 15a – First mode
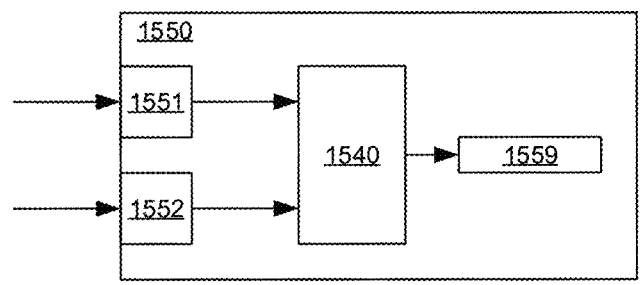
Figure 15b – Second mode

INTEGRATED CIRCUIT WITH ASYMMETRIC ACCESS PRIVILEGES

The present disclosure claims priority to U.S. Non-Provisional patent application Ser. No. 17/232,514, filed on Apr. 16, 2021, and U.S. Provisional Patent Application Ser. No. 63/138,950, filed Jan. 19, 2021, which are incorporated by reference herein in its entirety.

TECHNICAL FIELD

Examples described herein relate to integrated circuits, for example integrated circuits for protecting and/or controlling the functionality of itself and/or an output component, such as a transducer.

BACKGROUND

Many computing platforms interface with an output component via an integrated circuit (hereafter "IC"). In these examples, a processor may be in communicative contact, i.e. coupled, with the output component, for example to protect and/or control a function of the IC and/or an output component, via a first signal path. The first signal path may comprise the IC.

FIG. 1 shows an example prior art system 100. In this system 100 a processor 101 is coupled to an IC 150 which comprises a control interface 151, a data interface 152, a bus 153, an on-chip processor 154, and an addressable space comprising a plurality (n) of address ranges $155_1$ to $155_n$ (hereafter will, combined, be designated by 155). The IC, or chip, 150 may comprise, or be associated with (e.g. coupled to) at least one output component 190. The control interface 151 may, via the bus 153, provide the processor 101 with access to the address ranges 155 of the IC 150. The address ranges 155 of the IC 150 may comprise a set of registers, for example addressable 'control' memory spaces (hereafter "addressable control spaces"), and a set of memory for data storage, e.g. addressable 'data' memory spaces (hereafter "addressable data spaces"), e.g. RAM blocks. The processor 154 of the IC may output control and/or data signals, for example audio and/or video and/or haptic data signals etc., to the output component 190. The system 100 also comprises a controller 103 (such as a microcontroller (MCU), for example a secure microcontroller) or processor (such as a microprocessor, for example a secure microprocessor). The on-chip processor 154 may control the function of the output component 190 based on data received via the data interface 152. The processor 154 of the IC may comprise a digital signal processor (DSP) and may be configured to process a signal received at data interface 152 and may output control and/or data signals to the output component 190 which then acts upon the received signal.

According to the prior art system 100, during the boot (e.g. secure boot), or start-up, of the IC 150 (and/or of the output component 190), the processor 101 instructs the MCU 103 to load firmware into the address ranges 155 of the IC 150 (e.g. into the data spaces thereof). Additionally and/or alternatively, the MCU 103 may load the firmware autonomously after it is powered-up and/or the system 100 may be designed such that the processor 101 won't boot until after the MCU 103 signals to it to indicate that the MCU 103 has initialized system hardware. The MCU 103 may also be able to program other control settings into one or more address ranges of the IC 150, such as runtime settings for the IC processor 154 and/or the one or more output components 190.

During runtime of the IC 150 however, the external processor 101 can only control the IC 150 to switch between an ON and an OFF state. During runtime of the IC 150, the processor 101 therefore only has a basic ON/OFF control of the IC 150 (e.g. the processor 101 may have access to a power pin (not shown) of the IC 150 via a general-purpose input/output (GPIO) interface).

It is therefore desirable for the processor 101 to have more control over the protection and/or functionality of the IC 150 and/or the output component 190.

However, if the prior art processor 101 were given runtime access to the IC 150, any malware running on the processor 101 could access the IC 150 (e.g. the address ranges 155 thereof) and could, for example, override any or all of the control settings, the firmware, the runtime firmware settings, etc. This could allow malware to cause irreversible damage to the IC 150 and/or the output component 190 (e.g. overloading). It is strongly desirable to protect against malicious actions being set in motion by software execution at system-level, and there is a need to ensure the security of devices (e.g. devices that comprise any components of the system 100).

The IC 150 may also comprise a digital-to-analogue converter (DAC) 156 for converting the output signal to an analogue output signal for driving the transducer 190. The inclusion of a DAC 156, or not, is a simple design choice that will be obvious to the skilled person depending upon the system requirements.

The present examples are concerned with providing an integrated circuit that can allow an external processor secure runtime control and/or protection of the IC and therefore an output component controlled by the IC. More specifically, the present examples are concerned with providing an integrated circuit that can allow an external processor access to a set of addressable ranges within the IC to allow the external processor runtime control and/or protection of the IC and/or output component.

STATEMENTS OF INVENTION

According to an example there is provided an integrated circuit comprising an addressable space comprising one or more (e.g. a plurality) address ranges, wherein the integrated circuit is configured to allow an external processor to access an authorized subset of the one or more address ranges. The circuit of this example permits an external processor (for example executing driver software) to access a subset of the address ranges and, in this way, give the processor some (but not full) control over the functionality of the integrated circuit and/or output component. In this way, the authorized subset may comprise those spaces deemed "safe" for a processor to access, e.g. during runtime and not just only during boot/start-up as for prior art integrated circuits and processors. The integrated circuit may be configured to allow the processor to access the authorized subset of the one or more address ranges during runtime of the integrated circuit. In this way, the integrated circuit of this example provides runtime control to an external processor, allowing the external processor to access some of its address ranges during runtime of the integrated circuit (e.g. for read, write, or read and write access). Prior art processors have no such control. The integrated circuit may comprise an interface configured to allow the processor to control access to the authorized subset of the one or more address ranges.

According to another example there is provided an integrated circuit comprising an interface configured to provide controlled access to an authorized subset of one or more address ranges of the integrated circuit. As for the above example, the circuit of this example permits an external processor (for example executing driver software) to access a subset of the address ranges and, in this way, give the processor some (but not full) control over the functionality of the integrated circuit and/or output component. In this way, the authorized subset may comprise those spaces deemed "safe" for a processor to access, e.g. during runtime and not only during boot/start-up as for prior art integrated circuits and processors. The interface may be configured to provide access control to an authorized subset of one or more address ranges of the integrated circuit during runtime of the integrated circuit. As for the above example, in this way, the integrated circuit provides runtime control to the processor, allowing the processor to access some of its address ranges whereas prior art processors have no such control. The interface may comprise a control interface.

The integrated circuit may be further configured to allow an external processor (such as a microcontroller) to access each of the one or more address ranges during boot/start-up of the integrated circuit. In one example, for this purpose, the integrated circuit may comprise another interface configured to allow the processor to control the access to each of the one or more address ranges of the integrated circuit during boot/start-up. The other interface may comprise a control interface. In this way, according to some examples the integrated circuit may comprise an interface configured to permit a processor to access a subset of the one or more address ranges of the integrated circuit during runtime and another interface configured to permit a processor to access the one or more (e.g. a plurality of, for example each one of a plurality) of the address ranges in an addressable space of the circuit during boot/start-up. The interface may therefore be termed a "restricted interface" or a "restricted control interface" (in that it permits access to a restricted number of the spaces, e.g. a subset) and the other interface may therefore be termed an "unrestricted interface" or "unrestricted control interface". Hereafter in this specification the unrestricted interface is termed the 'first interface' and the restricted interface is termed a 'second interface' having regard to the chronological sequence of usage of each interface during a use of the integrated circuit.

According to another example there is provided an integrated circuit comprising one or more address ranges, wherein the integrated circuit is configured to allow an external processor to access at least one address range of the one or more address ranges during runtime control of the integrated circuit. The circuit of this example permits an external processor (for example executing driver software) to access an address range of the integrated circuit during runtime, giving the processor runtime control over the functionality of the integrated circuit and/or output component. Prior art integrated circuits provide no such runtime access to the address ranges of an integrated circuit. The integrated circuit may comprise an interface configured to allow the external processor to control access, or to allow the external processor controlled access, to at least one address range of the one or more address ranges during runtime control of the integrated circuit.

According to another example there is provided an integrated circuit comprising an interface (e.g. a control interface), wherein the interface is configured to allow an external processor to access at least one address range of the integrated circuit during runtime control of the integrated circuit. As for the third example, the circuit of this example permits an external processor (for example executing driver software) to access an address range of the integrated circuit during runtime, giving the external processor runtime control over the functionality of the integrated circuit and/or output component. Prior art integrated circuits provide no such runtime access to the space of an integrated circuit. The interface may comprise a control interface.

In either of the above examples, the integrated circuit may be configured to allow the processor to access each of one or more address ranges during boot/start-up of the integrated circuit. The integrated circuit may also comprise another interface, or control interface, wherein the other interface is configured to allow the processor to control access, or to allow the processor controlled access, to each of the one or more address ranges of the integrated circuit during boot/start-up of the integrated circuit.

According to another example to be explained below, an integrated circuit may comprise two interfaces and may be capable of adopting a configuration that is as described with respect to the examples above. In these examples, the integrated circuit is capable of adopting a configuration, or state, in which one of the two interfaces is permitted access to a subset of the addressable spaces (as described above), or prevented access to a subset of the addressable spaces (as described above), and therefore is configured as the "restricted" interface, the other interface being configured as the "unrestricted" interface.

In any of the examples, the integrated circuit may be configured to set the access privileges of/for the one or more address ranges to designate a subset of the one or more address ranges as the authorized subset, or to designate a particular one or more of the address ranges as accessible during runtime of the integrated circuit. For example, the integrated circuit may comprise a control unit configured to set the access privileges of the one or more address ranges to designate a subset of the one or more address ranges as an authorized subset.

According to another example there is provided an integrated circuit comprising one or more address ranges, wherein the integrated circuit is configured to set an access permission of at least one of the one or more address ranges. As for the above examples, the integrated circuit in this example may designate a subset of its address ranges as accessible, and that an external processor can access, e.g. during runtime of the integrated circuit, e.g. via an interface. The integrated circuit may comprise a control unit configured to set the access permission of the at least one address range. The integrated circuit may comprise a control interface, wherein the interface is configured to provide access to an authorized or restricted subset of the one or more address ranges, the authorized subset comprising a set of address ranges being determined by the integrated circuit. The integrated circuit may further comprise another interface, or control interface, wherein the other interface is configured to provide access to each, e.g. unrestricted access, address range of the one or more address ranges (e.g. on boot/start-up).

In any of the examples, the one or more address ranges may comprise a set of addressable control spaces and a set of addressable memory spaces, and the authorized subset may comprise at least one addressable control space and at least one addressable memory space. The one or more address ranges may comprise any one or more of an internal addressable space of the IC, an electronic register, a programmable data memory and/or a programmable data structure. Each of the address ranges may be configured to store an individual bit of a binary word such as a byte of data.

The integrated circuit according to any of the above examples may comprise a circuit processor or on-chip processor, for example a digital signal processor (DSP). The circuit processor may, in combination with one of the addressable control and/or data spaces of the circuit, control an output component and may therefore also protect the output component. The output component may comprise a transducer that converts energy from one form to another. The transducer may comprise: an active transducer; a passive transducer; an electrical (resistive, inductive and/or capacitive) transducer; an analogue transducer; a digital transducer; a thermal transducer; a pressure transducer; a displacement transducer; an oscillator transducer; a flow transducer; a piezoelectric transducer; a chemical transducer; a mutual induction transducer; a magnetic transducer; a Hall Effect transducer; a electrochemical transducer; a mass-based transducer and/or an optical transducer.

The integrated circuit may comprise a data interface. Together with the two interfaces described above, such as the control interfaces, the data interface may therefore define a third interface of the circuit. The data interface may be configured to receive data, for example an input signal. In some examples the data interface may be configured to receive an audio signal, for example a digital signal such as a pulse-code-modulated (PCM) signal.

The integrated circuit may comprise a bus (e.g. an on-chip) bus, optionally wherein the bus is coupled to at least one of: the interface or interfaces, at least one addressable space and/or the circuit processor. An (external) processor may be configured to access at least one of the circuit's address ranges in the addressable space by communicating with the spaces via the bus (and via one of the interfaces). In examples where the integrated circuit comprises a control unit (e.g. a programmable access control, or PAC, unit) that is configured to set the access privileges of the one or more address ranges to designate a subset of the one or more address ranges as an authorized subset. The PAC unit may be coupled to the unrestricted interface and to the bus. Through the bus, the PAC unit may be configured to access the one or more address ranges to change their permissions and designate a subset as the authorized subset to be accessible via the restricted interface. The processor (e.g. DSP) may also be coupled to the on-chip bus and may receive data via a (external to the integrated circuit) codec.

The control unit (e.g. PAC unit) may be implemented in the integrated circuit as hardware and/or software. The control unit may be configured to signal to a filter, or gate, whether to allow or block a particular access request (e.g. read or write) from an interface. The integrated circuit may comprise the filter, e.g. an address filter, which may be connected to the restricted interface and the control unit. The filter may be configured to block and/or allow access to at least one address range of the integrated circuit. The control unit may comprise a policy table. The policy table, or comparison table, may comprise a data structure, such as a look-up table (LUT) having one or more access policy entries. Each entry may define a block(s) or region(s) within the addressable space of the integrated circuit together with associated access permissions for at least one address range in the addressable space. For example, the policy table may define a set of address ranges in association with an access permission. The access permission may comprise a permission to read, write, or read and write at least one address range in the addressable space. An access permission may be stored for a set of the address ranges, and the set may be defined by a start address and an end address, or start address and an address length (the length defining the end address). In this way, the subset of address ranges that are designated as authorized may be designated as such by associated access permissions stored in the policy table. The control unit may also comprise an audit unit, or audit module, that may comprise hardware and/or software (e.g. a comparator and/or combinatorial logic) that may be configured to compare incoming information pertaining to an access request received via an interface with entries in the policy table and may be further configured to determine whether to block or allow the request pertaining to the access information. The audit unit may be further configured to provide the filter or gate, e.g. address gate, with an "allow access" signal to permit the interface to access the space pertaining to the request, otherwise the filter or gate may deny or block the request. By "access information" it is meant to comprise the details of an incoming request from an external entity (e.g. an external processor) to an addressable space within the integrated circuit. The access information, or request, may comprise one or more of the address of the space (or location), the nature of the request (e.g. read or write), and the data to be written into the said space. More specifically, according to an example, a request to read or write or read and write at least one address range of the addressable space may be received via an interface (e.g. the restricted interface as described above). The audit unit, or module, of the control unit compares the at least one address range contained in the incoming information with the associated access permission (e.g. stored in the policy table) to determine whether to block or allow the request. For example, it may be determined whether the at least one address range lies within a set of address ranges associated with a write or read or read and write access permission. For example, if the request is to read a given address range then it may be determined whether that given address range is associated with a read permission. If so, then the access request is allowed. In examples where the access permission is stored for sets of address ranges it may be determined if the at least one address range is contained within the set of address ranges associated with a given access permission (e.g. does the address range lie in between the range defined by the start and end ranges), or, in examples where the set is defined by a start address and a length, it may be determined whether the address lies in between the range "start address+block/address length−1" associated with a particular access permission. If, according to the policy or comparison table, the space is designated as authorized for any particular request then the audit unit sends an "allow access" signal to the gate (or filter or portal etc.), which adopts a configuration permitting an external processor to access the at least one address range in the addressable space. In one example the address filter comprises a default configuration according to which access is denied such that if, according to the policy table, the space to be read from or written to is not designated as authorized, then no "allow access" signal is sent to the filter which blocks the request.

The control unit may designate the authorized subset of address ranges via the access permissions stored in the policy table. The subset may therefore be designated as authorized by programming the policy table. The access permissions as stored in the policy table may be modifiable but may also be lockable such that any further writes to the policy table (and therefore changes to the policy table) are prevented. The authorized subset may comprise at least one address range associated with an access permission that comprises permission to read, write, or read and write the at least one range. The authorized subset may therefore comprise at least one of a read subset, a write subset, and a read and write subset. In examples where the policy table is lockable, its access permissions may be set such that they are not able to be changed other than via resetting the integrated circuit which effectively clears the policy table.

In another example, the integrated circuit may comprise a plurality of interfaces, where each interface is configurable to be the restricted interface or the unrestricted interface. In one example, an integrated circuit may comprise N interfaces (N being an integer of 1 or more), each of which are configurable to be the restricted or unrestricted interface, and that, according to one configuration, one interface is configured as the unrestricted interface and N−1 interfaces are configured to be the restricted interface. In a two interface example, each of the two interfaces is connected to the control unit (which may comprise the policy table and audit module as above) and each of the two interfaces is connected to a respective associated filter. For this purpose, the integrated circuit may comprise a dedicated address range which is configured to turn ON one of the filters and turn OFF the other filter—the interface associated with the ON filter being the restricted interface since incoming access requests will be checked by the mechanism as described above, whereas no such check is performed for the other interface (with the OFF filter), this interface thereby being the unrestricted interface since it has access to all of the spaces. Rather than a dedicated address range, the IC may be configured (e.g. by non-volatile memory such as one-time-programmable (OTP) memory) to designate one interface as unrestricted and the remaining interface (or interfaces) as restricted. In this way, the IC confers onto a user a choice as to which interface is the restricted unrestricted and which of the remaining interfaces is/are the restricted interface(s).

In another example, the integrated circuit may comprise an unrestricted interface as described above and a plurality (e.g. more than one, for example M, where M is an integer) restricted interface. In this example, each restricted interface may be associated with its own policy table such that each restricted interface has unique access permissions, in that each restricted interface may be able to access a unique authorized subset of spaces.

Accordingly in one example there is provided an integrated circuit comprising an interface, an internal addressable space comprising a plurality of address ranges, wherein the interface is coupled to the internal addressable space, wherein the integrated circuit is configurable in a first state to allow or deny the interface access to a subset of the plurality of address ranges of the internal addressable space.

Accordingly in one example there is provided an integrated circuit comprising an interface, a plurality of memory locations, wherein the interface is coupled to the plurality of memory locations, wherein the integrated circuit is configurable in a first state to allow or deny the interface access to a subset of the plurality of memory locations.

In another example there is provided an integrated circuit comprising an interface, an internal addressable space comprising a plurality of address ranges, wherein the interface is coupled to the internal addressable space, and wherein access to a first subset of the plurality of address ranges is permitted via the interface and access to a second subset of the plurality of address ranges is prevented via the interface.

In another example there is provided an integrated circuit comprising an interface and a plurality of memory locations, wherein the interface is coupled to the plurality of memory locations, and wherein access to a first subset of the plurality of memory locations is permitted via the interface and access to a second subset of the plurality of memory locations is prevented via the interface.

In another example there is provided an integrated circuit comprising first and second interfaces, an internal addressable space comprising one or more address ranges, and a control unit. Each of the first and second interfaces is coupled to the internal addressable space via the control unit, and the control unit is configurable in a first state in which the control unit is configured to allow or deny the second interface access to a subset of the one or more address ranges of the internal addressable space.

The configuration of the control unit may be set via the first interface.

The control unit may comprise a gate having an ON state and an OFF state. The second interface may be coupled to the internal addressable space via the gate. The control unit being configured in the first state may correspond to the gate being configured in the ON state. The state of the gate may be lockable, e.g. by the control unit, such that the state of the gate is prevented from being changed. Changing the state of the gate (e.g. from ON back to OFF) may only be possible by resetting the integrated circuit to effectively reset the gate to its default, OFF, configuration.

The control unit may comprise a policy table storing an access permission for the internal addressable space. The access permission may define the subset of the address ranges to which access is allowed or denied by the control unit when in the first state.

The control unit may comprise a policy table storing an access permission for the internal addressable space. The access permission may define the subset of address ranges to which access is allowed or denied by the control unit when in the first state. The gate may be coupled to the policy table such that, in the ON state, the gate is configured to allow or deny access to the subset of the internal addressable space according to the policy table.

The control unit may further comprise an audit module configured to, for an incoming request received via the second interface to access at least one address of the one or more address ranges, access the policy table to determine an access permission associated with the at least one address, and to transmit a signal to the gate. The gate, in the ON state, may be configured to, on receipt of the signal from the audit module, adopt a configuration according to which the received access request is allowed or denied depending on the access permission associated with the at least one space.

The ON/OFF state of the gate may be configured to be controllable via non-volatile memory. The non-volatile memory may comprise one-time-programmable (OTP) memory.

The audit module comprises a comparator or combinatorial logic.

The incoming access request received via the second interface may comprise a request to read, write, or read and write the at least one address. The associated access permission may comprise a permission to read, write, or read and write the at least one address.

The policy table may be configured to store an access permission for a set of address ranges in the internal addressable space. The access permission in the policy table may be configured to be set via the first interface.

The integrated circuit may be configured such that, following boot of the integrated circuit, modification of the access permission stored in the policy table is prevented.

In the first state, the control unit may be configured to store an access permission defining the subset of address ranges to which access is allowed or denied via the second interface. The access permission may be configured to be set via the first interface.

When in the first state, the control unit may be configured to allow the first interface access to the one or more address ranges of the internal addressable space.

The control unit may comprises a gate having an ON state and an OFF state. The first interface may be coupled to the internal addressable space via the gate. The control unit being configured in the first state may correspond to the gate being configured in the OFF state.

According to an example, the integrated circuit may be provided when the control unit is configured in the first state.

The integrated circuit may comprise a plurality of second interfaces. Each of the plurality of second interfaces may be coupled to the internal addressable space via the control unit. The control unit may be configurable in a state in which the control unit is configured to allow or deny a subset of the plurality of second interface access to the subset of the address ranges.

The integrated circuit may comprise a plurality of second interfaces and a plurality of control units. Each of the plurality of second interfaces may be coupled to the internal addressable space via a respective control unit. Each control unit may be configurable in a first state in which the control unit is configured to allow or deny a respective second interface access to at least one respective subset of the address ranges.

The configuration of each of the plurality of control units is set via the first interface.

According to another example there is provided an integrated circuit comprising first and second interfaces and an internal addressable space comprising one or more address ranges. Each of the first and second interfaces is coupled to the internal addressable space, and access to a first subset of the one or more address ranges is permitted and access to a second subset of the one or more address ranges is prevented via the second interface.

Access to the one or more address ranges may be permitted via the first interface.

The integrated circuit may comprise a policy table that is configured to store an access permission for at least a subset of the one or more address ranges such that the first and second subsets are defined according to their associated access permissions stored in the policy table.

The access permission may be configured to be set via the first interface.

The integrated circuit may further comprise a gate and an audit module. The audit module may be coupled to the policy table and to the gate. The audit module may be configured to, for an incoming request received via the second interface to access at least one address of the one or more address ranges, access the policy table to determine an access permission associated with at least one space, and to transmit a signal to the gate. The gate may be configured to, on receipt of the signal from the audit module, adopt a configuration according to which the received access request is allowed or denied depending on the access permission associated with the at least one space.

According to an example, a system comprises the integrated circuit as above, and a secure microcontroller coupled to the addressable space via the first interface, and a processor coupled to the addressable space via at least one second interface.

The processor may be configured to trigger the secure microcontroller to initialize the integrated circuit.

The processor may be configured to initialize an operating system. The secure microcontroller may be configured to initialize the integrated circuit prior to the completion of the processor initializing the operating system.

According to another example there is provided an integrated circuit comprising first and second interfaces, and an internal addressable space comprising one or more address ranges. The integrated circuit is configurable such that access to the one or more address ranges is permitted via one of the first and second interfaces and, via the other one of the first and second interfaces, access to a first subset of the one or more address ranges is allowed and access to a second subset of the one or more address ranges is denied.

Other examples provide a system comprising an integrated circuit as recited above. The system may, in addition to the integrated circuit, comprise an external processor configured to access the integrated circuit, for example via an interface (such as a control interface) of the integrated circuit. This processor may be termed a "main processor" or "applications processor" to distinguish it from other processors in the system (e.g. a processor of the integrated circuit). The system may also comprise a motherboard and the main processor may communicate with the integrated circuit via the motherboard which may also comprise a chipset (or platform control hub), a microcontroller (MCU) (or microprocessor, hereafter the terms should be regarded as synonymous) and/or a codec. The main processor may be configured to execute driver software and application software, e.g. accessing the integrated circuit via the motherboard.

The codec may be coupled to the integrated circuit via the data interface and, via the data interface, may transmit signals to the processor (e.g. the DSP) of the integrated circuit. The on-chip processor of the integrated circuit (e.g. the DSP) may therefore be configured to receive data from the codec via the data interface. The main processor may be coupled to both the chipset/PCH and MCU. For example, the chipset/PCH may be coupled to the main processor and to the second, or restricted, interface and the MCU may be coupled to the main processor and to the first, or unrestricted, interface. Then, via the chipset/PCH, the main processor may be configured to access the addressable space of the circuit through the second interface.

As described above, the (authorized) subset of address ranges accessible via the main processor through the second interface is a restricted set (in that it is a subset of the one or more or plurality) and this subset may allow the main processor, executing driver software, to access at least one control space (or register) of the integrated circuit during runtime of the circuit (or of an output component coupled to the circuit). In this way, through the second interface the main processor has runtime control of the circuit but not full access to its address ranges. On the other hand, the first interface allows unrestricted access to each of the address ranges of the circuit and the processor is therefore connected to the first interface via the secure MCU to access the address ranges during start-up or boot of the integrated circuit. Runtime control may comprise real-time control or reactive control and be comprise control over the integrated circuit and/or output component at a time other than boot or start-up of the circuit.

The secure MCU is configured to be impervious to malware as will be understood by the skilled person. In this way, although the main processor (via the first interface) can access all of the addressable spaces of the integrated circuit, since this access is via the secure MCU, malware cannot access the addressable spaces via the first interface. Via the secure MCU, the main processor may be configured to execute application software, download and/or load firmware and/or any other security critical settings into a least one address space of the integrated circuit in a secure way impervious to malware.

Access to the addressable space via the second interface is not via the secure MCU. The authorized subset of address ranges, accessible to the processor via the second interface, may therefore comprise those spaces which are not a hazard to or breach of security. In this way, if any malware were to gain access to any of the authorized subset of address ranges, via the second interface, the risk of damage and/or malfunctioning to/of the circuit is low or non-existent since those address ranges that could lead to circuit damage/malfunction are not part of the authorized subset and are therefore only accessible via the secure MCU which is impervious to malware.

In one particular (but not limiting) example the system comprises an audio system. The codec comprises an audio codec (e.g. a high-definition audio (HDA) codec) to transmit a digital, e.g. PCM, audio signal to the DSP of the circuit. The output component is an amplifier transducer which amplifies the signal received at the DSP to then be output to a speaker for the speaker to output the audio in the form of sound waves. In this example the integrated circuit may comprise an amplifier integrated circuit.

According to an example there is provided an integrated circuit comprising an interface and a gate, wherein the interface is coupled to the gate, and wherein the gate is configurable in one of two states, wherein the state of the gate is based on data associated with an access requested received via the interface. In another example there is provided an integrated circuit comprising an interface and a gate, wherein the interface is coupled to the gate and is configured to receive an access request, wherein the gate is configured to allow or deny access to the interface based on data associated with the access request. The two states of the gate may comprise an ALLOW state where the gate is configured to allow the access request and a DENY state where the gate is configured to deny the access request. The access request may describe a register, e.g. an address range, of the circuit to be accessed and, in the ALLOW state, the gate may be configured to allow access via the interface to the register of the circuit described by the access request. The integrated circuit may comprise a control module and/or policy table as described above to set the state of the gate in the manner described above.

According to another example, there is provided an integrated circuit comprising an internal addressable space comprising a plurality of address ranges, a control unit configurable in a first state and a second state, and an interface coupled to the internal addressable space via the control unit, wherein, when the control unit is configured in the first state, the interface has unrestricted access to the plurality of address ranges via the control unit and, when the control unit is configured in the second state, the interface has access to a restricted subset of the plurality of address ranges via the control unit.

In this example, the integrated circuit may be provided with a single interface (as opposed to two interfaces in some of the examples set out above) and the configuration of the control unit, and therefore the integrated circuit, is set via that single interface. When the control unit is configured in the first state, the control unit is configurable via the interface to be in the second state. In other words, the default configuration of the control unit (and therefore the circuit) is the first state in which access to the internal space is unrestricted, but it is configurable, via the interface, to be in the second state where the access becomes restricted. One advantage of this configuration is that a single processor (such as an application processor) may securely load the integrated circuit with firmware and configure the integrated circuit (when in the first state) and have runtime control of the integrated circuit (when in the second state). Therefore, a separate secure controller is not needed. Separation within the processor between a system bootloader (e.g. unified extensible firmware interface (UEFI) boot which is considered secure) and the main OS (considered insecure) may be used to accomplish the secure loading and configuring the integrated circuit via the single external processor. In the unrestricted first state the integrated circuit permits the UEFI bootloader on the processor to load the integrated circuit and configure address range access for the main operating system. The external processor may then transition the control unit to the second, restricted, state in a manner described below. This transition from the first state to the second state may be irreversible without resetting the control unit in a manner described below. Once in the second state, the main operating system can initialise, and the external processor can have runtime control of the integrated circuit. As such, the restricted subset of the plurality of address ranges may exclude configuration registers for the control unit.

The control unit may comprise a policy table as described above with respect to other examples. The policy table is configured to store an access permission for the internal addressable space, the access permission defining the restricted subset of the plurality of address ranges to which the interface has access when the control unit is configured in its second state. When the control unit is configured in the first state, the access permission is writable to the policy table, via the interface. In this way, configuring the control unit in its second state may correspond to configuring the policy table and defining the subset of address ranges to which access is restricted, for example by writing a policy and/or an access permission to the policy table.

When the control unit is configured in its second state, modifying the access permission of the policy table, via the interface, may be prevented. In this way, the control unit may be locked in its second state, and may only be reset in its first state by re-setting the access permission of the policy table. This may only be possible in some examples by a complete reset of the integrated circuit.

The control unit may comprise a gate as described above with respect to other examples. The gate may have an ON state and an OFF state and the interface may be coupled to the internal addressable space via the gate. When the control unit is configured in the first state, the gate may be configured in the OFF state, and when the control unit is configured in the second state, the gate may be configured in the ON state. In this way, configuring the control unit in its second state may correspond to configuring the gate to be in its ON state. Access to the internal addressable spaces may be via the gate and therefore configuring the gate in the ON state may place a restriction on the address ranges to which access is possible via the interface.

When the control unit is configured in the first state, the state of the gate may be settable via the interface. When the control unit is configured in the second state, the state of the gate may be prevented from being changed via the interface. When the control unit is configured in the second state, the control unit may only be placed in the first state by resetting the integrated circuit.

The integrated circuit may further comprise an audit module as described above with respect to other examples. The audit module may be configured to, for an incoming access request from an external processor via the interface, access at least one address of the plurality of address ranges, access the policy table to determine an access permission associated with the at least one address and to transmit a signal to the gate. The gate, when in the ON state, may be configured to, on receipt of the signal from the audit module, adopt a configuration according to which the received access request is allowed or denied depending on the access permission associated with the at least one space, stored in the policy table.

In summary, configuring the control unit in the second state may comprise defining an access permission stored in the policy table and/or configuring the gate in the ON state such that access to the address ranges is according to the policy.

The interface may be a first interface, and the integrated circuit may comprise a plurality of interfaces including the first interface. For example, the integrated circuit may comprise other interfaces such as those described above with respect to other examples.

According to another example there is provided a system comprising an integrated circuit as described above and a processor connected to the interface of the integrated circuit, wherein the processor comprises a first state and a second state, such that, when configured in the first state, the processor is configured to execute bootloader firmware and, when configured in the second state, the processor is configured to initialise and execute an operating system, wherein the processor being in its first state corresponds to the control unit being in its first state and wherein the processor being in its second state corresponds to the control unit being in its second state.

When configured in the first state, the processor may be configured to cause the control unit to transition from its first state to its second state. In other words, a processor may be configured to cause access via the interface to be restricted (to the subset of the full set of address ranges), as discussed above. When configured in the first state, the processor may be configured to write the access permission defining the restricted subset of the plurality of address ranges to the policy table. When configured in the first state, the processor may be configured to cause the gate to transition from its OFF state to its ON state. As discussed above, either of these actions may cause the controller to transition from its first state to its second state. When configured in its second state, the processor may be configured such that it cannot cause the control unit to transition from its second state to its first state without causing itself to transition to its first state (e.g. by rebooting the processor).

According to another example there is provided an integrated circuit comprising first and second interfaces, an internal addressable space comprising a plurality of address ranges; and a control unit, wherein each of the first and second interfaces is coupled to the internal addressable space via the control unit, wherein the control unit is configurable in first, second, and third states, wherein, when the control unit is configured in the first state, the first interface has unrestricted access to the plurality of address ranges via the control unit and, wherein, when the control unit is configured in the second state, the first interface has access to a restricted subset of the plurality of address ranges via the control unit, and, when the control unit is configured in the third state, the control unit is configured to allow or deny the second interface access to a subset of the plurality of address ranges of the internal addressable space.

In this example there is provided a two-interface integrated circuit and access to the plurality of address ranges may be restricted through either interface. Via one interface, the control unit may be placed in a state according to which access to the internal addressable space is restricted either through that interface or through another interface. It will be appreciated from the preceding paragraphs that some of the examples herein relate to a dual-interface solution for an integrated circuit (according to which one unrestricted interface can configure the circuit such that another interface becomes restricted) while others relate to a single-interface solution (according to which an initially unrestricted interface can configure the circuit such that it becomes restricted).

As for the preceding examples, when the control unit is configured in the first state, the control unit may be configurable via the first interface to be in the second state, and/or the configuration of the control unit may be set via the first interface.

According to another example there is provided an integrated circuit comprising an internal addressable space comprising a plurality of address ranges, a control unit storing a policy, and an interface coupled to the internal addressable space via the control unit, wherein the control unit is configurable, via the interface, in a lockable state in which the interface has access to a restricted subset of the plurality of address ranges via the control unit as defined by the policy stored in the control unit.

The policy stored in the control unit may be settable via the interface, as described above, and configuring the control unit in the lockable state may comprise setting the policy via the interface. The integrated circuit may further comprise a gate as described above, wherein the interface is coupled to the internal addressable space via the gate, and wherein the gate comprises an ON state and an OFF state such that, when in its ON state, the gate allows or denies access, via the interface, to a given address according to an entry in the policy stored in the control unit corresponding to the given address, and configuring the control unit in the lockable state comprises configuring the gate in the ON state.

According to another example there is provided an integrated circuit comprising first and second interfaces coupled to an internal addressable space, the integrated circuit being configurable in first and second modes, such that, in the first mode, the first interface has unrestricted access to the plurality of address ranges, and the integrated circuit is configurable such that the first interface has restricted access to the plurality of address ranges, the restricted access being restricted to a subset of the plurality of address ranges and, in the second mode, the first interface has unrestricted access to the plurality of address ranges of the internal addressable space and the second interface has restricted access to the plurality of address ranges, the restricted access being restricted to a subset of the plurality of address ranges. In an example there is provided the integrated circuit configured in the first mode. In another example there is provided the configured in the second mode.

In another example there is provided an integrated circuit comprising first and second interfaces coupled to an internal addressable space having a plurality of address ranges. The first interface has unrestricted access to the plurality of address ranges and is configurable such that either the first or the second interface has restricted access to the plurality of address ranges, the restricted access being restricted to a subset of the plurality of address ranges.

Each of the first and second interfaces may be associated with a respective gate having an ON and an OFF state such that each gate, when in its ON state, permits access to the internal addressable space according to a policy stored in the integrated circuit. The first interface having unrestricted access to the plurality of address ranges corresponds to the gate associated with the first interface being OFF. Configuring the integrated circuit such that either the first or the second interface has restricted access to the plurality of address ranges, the restricted access being restricted to a subset of the plurality of address ranges, comprises changing the gate associated with either the first or second interface from OFF to ON. In an example, the gate associated with the first interface is OFF and the gate associated with the second interface is OFF. In another example, the gate associated with the first interface is OFF and the gate associated with the second interface is ON. In yet another example, the gate associated with the first interface is ON and the gate associated with the second interface is OFF.

In any of the above examples, a processor (e.g. external processor) may load firmware into the IC which, when executed, causes the IC (or the control unit thereof) to adopt a certain configuration (e.g. setting the gate configuration/ON or OFF state, programming the policy table etc.) but, in other examples, the firmware may be pre-loaded onto the IC. In these latter examples the IC comprises the firmware. The firmware may be stored on the IC in non-volatile memory. For example, the gate configuration and/or policy table configuration can be stored on the IC in non-volatile memory. Therefore, any given IC can be configured as part of its production (e.g. pre-loaded before it gets to the customer), configured by the customer (e.g. by a OTP operation), and may be configured by executing firmware stored in non-volatile memory on the IC.

Hereafter in this document the following abbreviations, introduced in the preceding section, will be used: "IC" will be used for integrated circuit, "MCU" for microcontroller, "OTP" for one-time-programming, "PAC" for programmable access control, "PCM" for pulse-code-modulation (or modulated), "HDA" for high-definition audio, "PCH" for platform control hub, "DSP" for digital signal processor, "OS" for operating system, and "UEFI" for unified extensible firmware interface.

INTRODUCTION OF THE FIGURES

The present disclosure may be understood with reference to the accompanying drawings in which:

FIG. 1 shows a prior art system;

FIGS. 2A-2E each show simplified schematic diagrams of integrated circuits according to five examples of the present disclosure; and FIG. 3 is a simplified schematic diagram of an example integrated circuit;

FIG. 4 shows a table illustrating the access and control that a processor has to an integrated circuit according to the present disclosure when compared to a prior art integrated circuit;

Figure 16A:
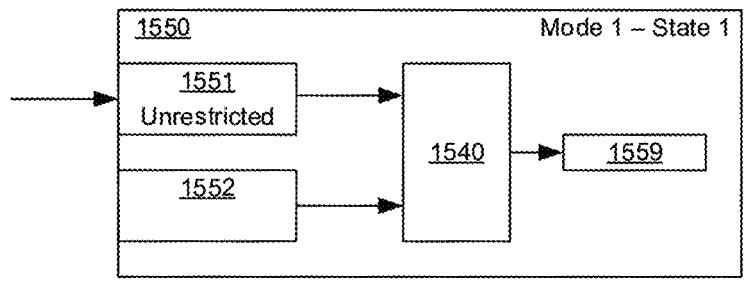
Figure 16B:
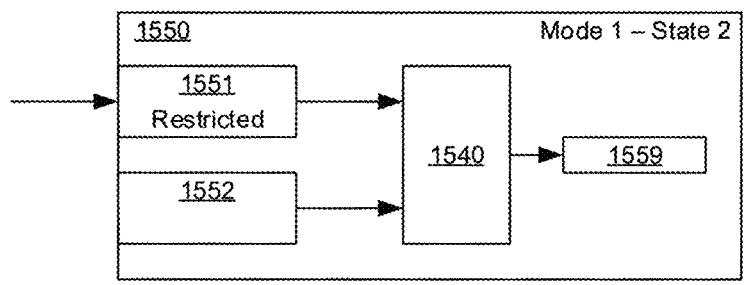
Figure 16C:
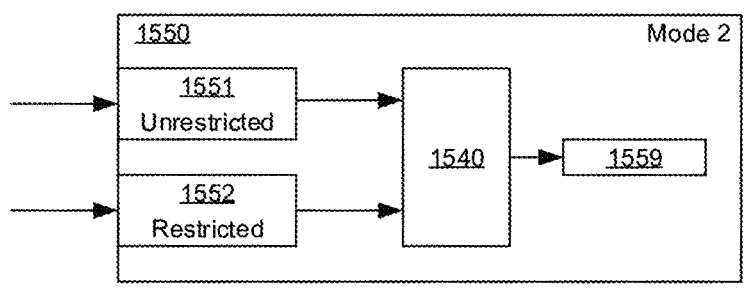

FIGS. 15a and 15b (which may be collectively referred to herein as FIG. 15) are simplified schematic block diagrams of an example integrated circuit; and FIGS. 16a-16c are simplified schematic block diagrams of the example integrated circuit of the FIGS. 15a and 15b illustrate.

DETAILED DESCRIPTION WITH REFERENCE TO THE FIGURES

FIGS. 2A-2E each show a simplified schematic of an example IC 150a-150e. Each IC comprises one or more address ranges, which may comprise any one or more of an internal addressable space of the IC, an electronic register, a programmable data memory and/or a programmable data structure. In this document, the terms "address range" and "addressable space", and "address ranges" and "addressable spaces" may be used interchangeably. Furthermore, the terms "address range" and "memory location", and "address ranges" and "memory locations" may be used interchangeably.

In each of these figures an open padlock denotes an address range that is unrestricted/unprotected, whereas a closed padlock denotes an address range that is restricted/protected. As will be further explained below, according to some examples, access is permitted to only those ranges designated with an open padlock, which comprises a subset of the address ranges and which may be referred to as an "authorized", "safe", "designated", "open" or "restricted" (restricted in the sense that they are a subset of the plurality) subset of the address ranges.

FIG. 2A shows an IC 250a comprising a plurality of address ranges $255_1$ to $255_n$. The IC 250a is configured to allow a processor 101 (not shown) to access an authorized subset of the plurality of address ranges 255, i.e. "authorized address ranges", (indicated by the open padlock in the figure). This allows a main processor 101 access to a subset of the plurality of address ranges 255 of the IC 250a during runtime of the IC 250a, since the processor 101 may access only those address ranges designated as authorized (padlock open), whereas prior art ICs do not allow a processor access to neither any address during runtime of the IC nor any subset of address ranges whether authorized or not. Those address ranges designated as authorized may therefore be considered "safe" for a processor to access during runtime of the IC 250a and, as such, may not comprise any address ranges with security-critical control over the IC 250a and/or the output component 190. The authorized address ranges may also be referred to as accessible, or safe, or secure, or guarded, or designated, or open address ranges. As will be explained below, the IC 250a may comprise an interface to permit access to the authorized subset of address ranges 255.

FIG. 2B shows an IC 250b comprising a plurality of address ranges $256_1$ to $256_n$. The IC 250b is configured to allow a processor 101 (not shown) to access the plurality of address ranges 256 during runtime control of the IC 250b, as indicated by the dotted line. Whereas, in the FIG. 2A example a subset of the ICs address ranges are designated as authorized, and therefore accessible during runtime, in the FIG. 2B example each of the plurality of the address ranges 256 of the IC 250b are designated as accessible during runtime. In this way, all of, or each of, the plurality of address ranges 256 of the IC 250b may be an "authorized" set of address ranges and designated as safe for the processor 101 to access during runtime of the IC 250b and, as such, may not comprise any address ranges with security-critical control over the IC 250c. Thus, whereas, in the FIG. 2A example the set of address ranges are partitioned into those accessible during runtime and those that are not, the IC 250b of the FIG. 2B example comprises a set of address ranges that are all accessible during runtime of the IC 250b. As will be explained below, the IC 250b may comprise an interface to permit access to the authorized subset of the address ranges 255.

FIG. 2C shows an IC 250c comprising an interface 202a (which may comprise a control interface). The interface 202a is configured to provide access to an authorized subset of a plurality of address ranges 257 of the integrated circuit 250c (indicated by an open padlock). As described above for FIG. 2A, this allows a processor 101 (not shown) access, via the interface 202a, to a subset of the plurality of address ranges 257 of the IC 250c, e.g. during runtime of the IC 250c, since the processor 101 may access only those address ranges designated as authorized, which may therefore be considered "safe" for a processor to access during runtime of the IC 250c and, as such, may not comprise any address ranges with security-critical control over the IC 250c.

FIG. 2c illustrates an example IC 250c comprising an interface 202a, an internal addressable space comprising a plurality of address ranges 257, wherein the interface 202a is coupled to the internal addressable space, wherein the IC 250c is configurable in a first state to allow or deny the interface 202a access to a subset of the plurality of address ranges 257 of the internal addressable space, as will be described in further detail below.

FIG. 2c also illustrates an example IC 250c comprising an interface 202a, a plurality of memory locations 257, wherein the interface 202a is coupled to the plurality of memory locations 257, wherein the IC 250c is configurable in a first state to allow or deny the interface access to a subset of the plurality of memory locations 257, as will be described in further detail below.

FIG. 2c also illustrates an example IC 250c comprising an interface 202a, an internal addressable space comprising a plurality of address ranges 257, wherein the interface 202a is coupled to the internal addressable space, and wherein access to a first subset of the plurality of address ranges 257 is permitted via the interface 202a and access to a second subset of the plurality of address ranges 257 is prevented via the interface 202a, as will be described in further detail below.

FIG. 2c also illustrates an example IC 250c comprising an interface 202a and a plurality of memory locations 257, wherein the interface 202a is coupled to the plurality of memory locations 257, and wherein access to a first subset of the plurality of memory locations 257 is permitted via the interface 202a and access to a second subset of the plurality of memory locations 257 is prevented via the interface 202a, as will be described in further detail below.

Although FIG. 2C illustrates an IC 250c comprising a single interface 202a, in some examples the IC 250 may comprise two interfaces, e.g. first and second interfaces. The IC 250c may comprise a control unit. In these examples, each of the first and second interfaces is coupled to the internal addressable space (and/or address ranges and/or memory locations etc.) and, for example, via a control unit, in examples where the IC 250c comprises a control unit. The IC 250c may be configurable (or the control unit may be configurable, in examples where the IC 250c comprises the control unit) in a first state in which the second interface is allowed or denied access to a subset of the plurality of address ranges or memory locations of the IC 250c (e.g. the control unit may be configured to allow or deny the second interface access to the subset of address ranges or memory locations). In these examples, the depicted interface 202a may comprise the second interface and the additional (now depicted in FIG. 2c) interface may comprise the first interface. The configuration of the IC 250c and/or control unit may be set via the first interface.

In examples where the IC 250c comprises two interfaces, e.g. first and second interfaces, each of the first and second interfaces is coupled to the internal addressable space and/or address ranges and/or memory locations, and access to a first subset of the plurality of address ranges or memory locations may be permitted via the second interface and access to a second subset of the plurality of address ranges is prevented via the second interface. In these examples, the second interface may comprise the depicted interface 202a.

In examples where the IC 250c comprises two interfaces, e.g. first and second interfaces, the IC 250c may be configurable such that access to the plurality of address ranges or memory locations is permitted via one of the first and second interfaces and, via the other one of the first and second interfaces, access to a first subset of the plurality of address ranges or memory locations is allowed and access to a second subset of the plurality of address ranges or memory locations is denied. The IC 250c may comprise a control unit. The configuration of the IC 250c and/or the control unit may be set via the "one" of the first and second interfaces (having access to the plurality of address ranges or memory locations). The "other" of the first and second interfaces may comprise the depicted interface 202a of FIG. 2c.

With reference to FIG. 2c, those address ranges or memory locations 257 illustrated with an unlocked padlock may comprise the subset of address ranges or memory locations to which access is allowed or permitted, and those address ranges or memory locations illustrated with a locked padlock may comprise the subset of address ranges or memory locations to which access is denied or prevented, as described above.

FIG. 2D shows an IC 250d comprising an interface 202b (which may comprise a control interface). The interface 202b is configured to allow a processor 101 (not-shown) to access at least one address range $258_1$-$258n$ of the IC 250d during runtime control of the IC 250d, as indicated by the dotted line. Similarly, as described above for FIG. 2B, whereas, in the FIG. 2C example a subset of the ICs address ranges are designated as authorized, and therefore accessible during runtime, in the FIG. 2D example all of the plurality of the address ranges 258 of the IC 250d are designated as accessible during runtime. In this way, all of, or each of, the plurality of address ranges 258 of the IC 250d may be an "authorized" set of address ranges and designated as safe for the processor to access during runtime of the IC 250d and, as such, may not comprise any address ranges with security-critical control over the IC 250d.

FIG. 2E shows an IC 250e comprising a plurality of address ranges $259_1$-$259n$. The IC 250e is configured to set an access permission of at least one address range $259_1$-$259n$ of the plurality of address ranges 259, which is schematically indicated in FIG. 2E by each address range comprising a locked/unlocked padlock. The IC 250e may be configured to designate at least one address range 259$_1$-259n of the plurality as "authorized", "safe", "designated", "open" or "restricted" (restricted in the sense that they are a subset of the plurality), etc. and in this way the IC 250e may be configured to create a subset of address ranges from the plurality that are accessible, e.g. by a processor 101 (not shown), e.g. during runtime of the IC 250e. The IC 250e may also be configured to set the access permissions such that each of the plurality of address ranges 259 are accessible, e.g. by a processor 101 (not shown), on boot or start-up. As will be described below, the IC 250e may comprise a control unit (such as a PAC unit) that is configured to set the access permission of at least one address range 259$_1$-259n of the plurality.

The term "runtime" is intended to comprise a time after the completion of the boot or initialization process of the IC, and/or after a processor operating system is fully initialized and executing applications, and/or any time other than the boot or initialization of the IC.

The integrated circuit of any of the above examples comprise an integrated circuit comprising a plurality of address ranges, each address range being configurable in a first or a second state, each state being associated with an access permission (e.g. a read, write, or read and write access permission), wherein the integrated circuit is configured to provide runtime control to an external processor to the address ranges based on the access permission of each state. The access permission associated with each address range may be an allow permission and a deny permission and the set of address range associated with the allow access permission may comprise the authorized set of address ranges. The ALLOW state may comprise an ALLOW READ REQUEST (e.g. READ-ONLY), ALLOW WRITE REQUEST (e.g. WRITE-ONLY), or ALLOW READ AND WRITE REQUEST permission. This will be described further below.

The address ranges of any of ICs as discussed above with respect to FIGS. 2A-E may comprise a set of registers, for example addressable 'control' memory spaces (hereafter "addressable control spaces"), and a set of memory for data storage, e.g. addressable 'data' memory spaces (hereafter "addressable data spaces"), e.g. RAM blocks.

Figure 1:
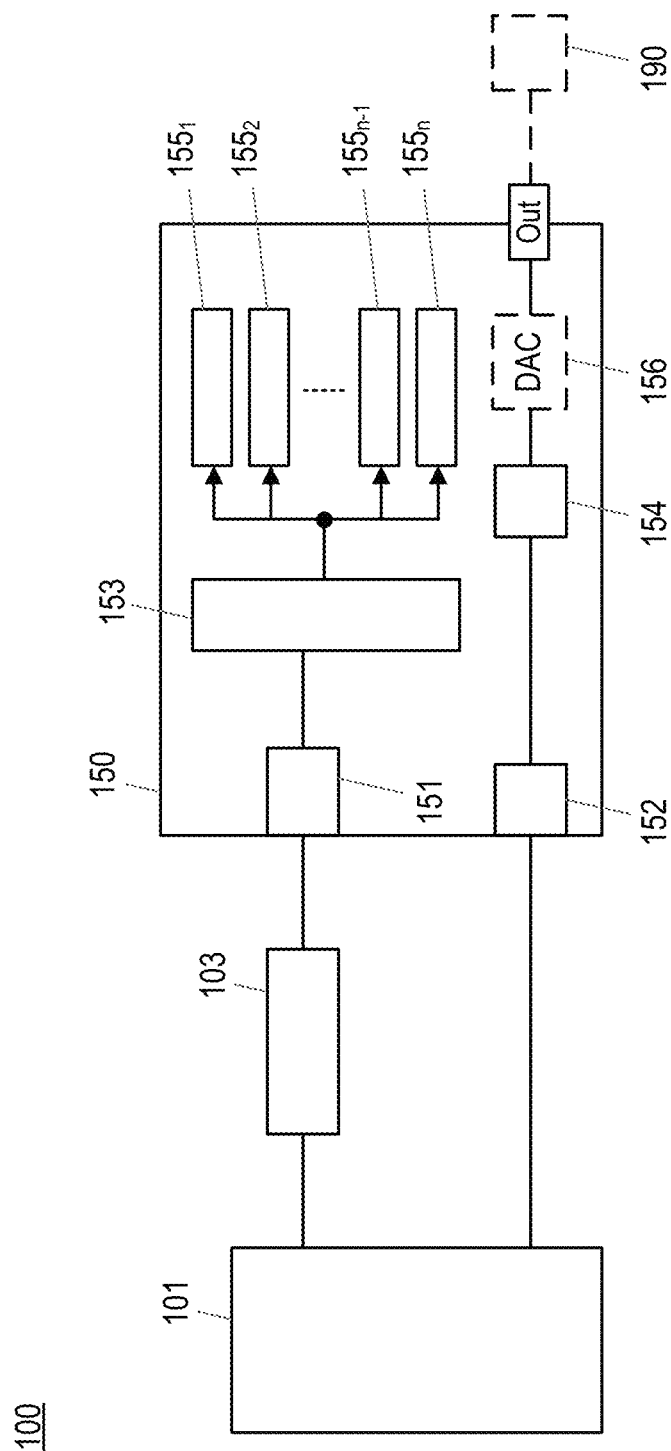
Figure 2:
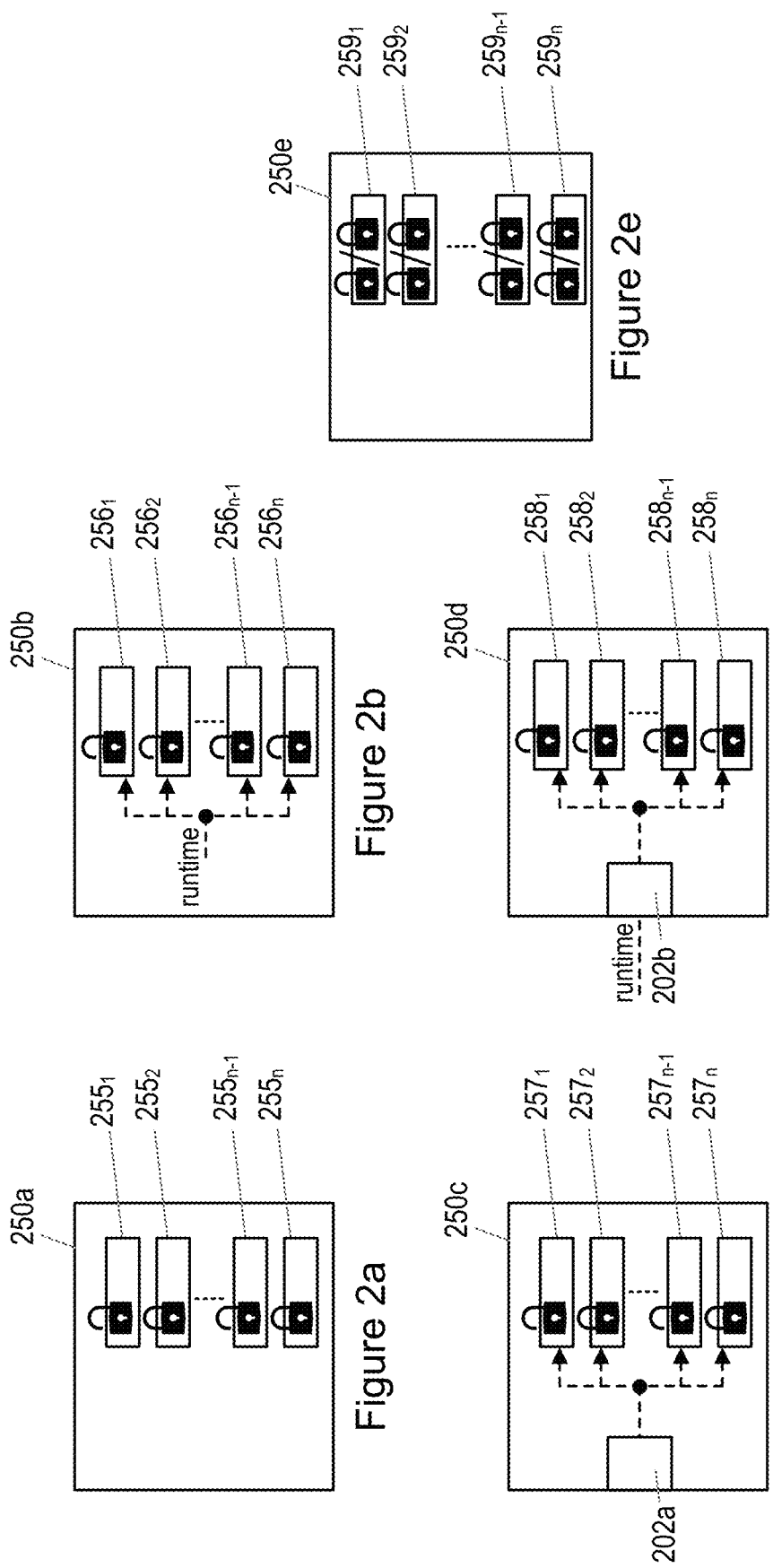
Figure 3:
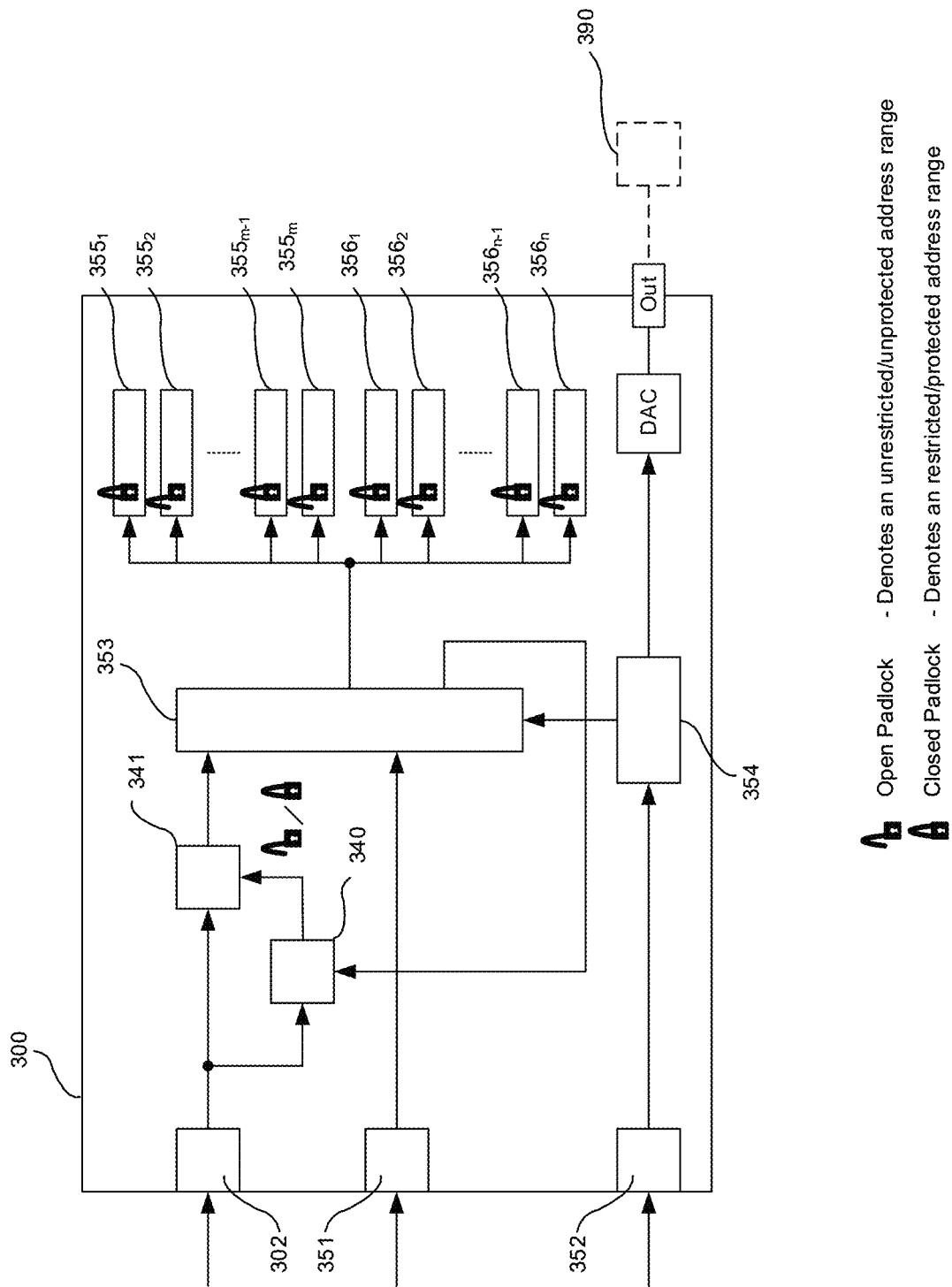

FIG. 3 shows an IC 300. The IC 300 may comprise any one of the ICs 250a-e as described above with reference to FIGS. 2A-2E. FIG. 3 is intended to show an example IC 300 comprising a plurality of elements, each performing a specified function, and that, although they are shown in combination in FIG. 3, it will be understood that the ICs 250a-e shown in FIGS. 2A-2E may comprise any one, or more, or any combination, of these elements if the functionality they permit is desired in one of the ICs 250a-e. As such, the combination of features shown in FIG. 3 should not be construed as limiting.

The IC 300 comprises a first interface 351 (e.g. a first control interface), a second interface 302 (e.g. a second control interface), a data interface 352, a bus 353 (e.g. an on-chip bus or internal bus, such as a communications bus), a on-chip processor 354, a control module 340, a filter or gate 341, an output component 390, and an addressable space comprising a plurality of address ranges 355, 356. The plurality of address ranges 355, 356 may comprise a set of addressable 'control' memory spaces (e.g. a register or a register space) or addressable control spaces 355 and a set of addressable 'data' memory spaces or addressable data spaces 356 (e.g. a block of RAM) as discussed above with respect to FIGS. 2A-E and to be described in more detail below.

The IC 300 is configured to be coupled to a (not shown) external processor 101. An external processor 101 may be configured to couple to one or more of the interfaces 302, 351, 352 of the IC 300, which is schematically indicated by the arrows going into the interfaces in FIG. 3. An external processor may be configured to access the IC 300 (e.g. a component thereof) via one or more of the interfaces 302, 351, 352. The bus 353 may be a communication network that couple various components of the IC 300 to each other as illustrated for example in FIG. 3. As shown in FIG. 3, the bus 353 couples the first and second interfaces 351, 302, and the IC processor 354 to at least the address ranges 355, 356 of the IC 300.

The data interface 352 may be to receive data from a data source, e.g. via a codec. For example, the data interface 352 may comprise an audio data interface, for example, to receive audio data such as a digital signal (e.g. a PCM signal). The internal processor 354 may be to process any data received at the data interface 352 and to transmit the processed signal to the output component 390 via a signal path from the data interface 352 to an output terminal to which the output component 390 is coupled. The data received at the interface 352, to be processed by on-chip processor 354 and transmitted to the output component 390, may comprise any digital data such as for example audio data, ultrasonic data, haptic data etc. The output component 390 may comprise a transducer, in some examples, such as an audio transducer (e.g. a speaker), a haptic transducer and/or an ultrasonic transducer.

The plurality of address ranges comprise a set of addressable control spaces 355 (m are shown in the figure) and a set of addressable data spaces (n are shown in the figure) (n and m may be equal or not equal such that the IC 300 may comprise the same number, or a different number, of addressable control spaces 355 and addressable data spaces 356). At least one, or each one, of the addressable data spaces 356 may comprise one or more units of memory. The addressable data spaces 356 may comprise volatile or non-volatile memory, such as RAM (e.g. DRAM or SRAM), ROM, Flash memory etc. The addressable data spaces 356 may be configured to store code, e.g. according to which the IC 300 is to function. For example (and as will be explained later with reference to FIG. 6) the addressable data spaces 356 may be configured to store firmware, e.g. for execution by the on-chip processor 354. At least one, or each one, of the addressable control spaces 355 may be configured to control and/or monitor a function of the IC 300 and/or output component 390 controlled by the IC 300. A specific example will be described later with reference to an IC 300 controlling an audio transducer.

Each addressable control space 355 may comprise one or more units of memory storing information that can control and configure a functions of the IC 300. Each addressable control space 355 may also store control status data about the current state of a function within the IC 300. These functions may comprise, but are not limited to, features of the IC 300 that are deemed necessary for the functional operation of the IC 300 and/or other external components associated with the IC 300 (such as the output component 390 or any and all external transducers). In contrast, each addressable data space 356 may comprise one or more units of memory containing a program and/or data that is needed for the on-chip processor 354 to be operational. These locations may also comprise data outputs and/or temporary variables of the processor 354.

For example, an addressable control space may be configured to store bits that may be configured to control and/or configure the functions within the IC 300, and/or provide status information about the IC 300 that can be read via the interfaces 302 and/or 351. Additionally and/or alternatively, an addressable data space 356 may be configured to store bits that may be configured to act as firmware for the on-chip processor 354 to function correctly and/or be configured to store runtime controls and/or be configured to store data such as temporary data (e.g. temporary data needed for an addressable data space 356) and/or be configured to store data (such as PCM data) from the interface 352 and/or be configured to temporarily store processed data to be transmitted to the output component 390 via the DAC.

FIG. 3 shows that each one of the addressable spaces (both control and data) may be designated in one of two states, or with one of two access privileges. The two states are respectively indicated in FIG. 3 by an opened padlocked (State 1) and a closed padlock (State 2), which may respectively correspond to an authorized, i.e. ALLOW state, and unauthorized state, i.e. DENY state. The set of spaces designated with the unlocked padlock may be considered to be an authorized subset, or a subset, or a designated subset. The ALLOW state may comprise an ALLOW READ FROM and/or an ALLOW WRITE TO state. As shown in the FIG. 3, for illustrative purposes, every second space $355_2$-$355_m$ of the control spaces 355 is designated as authorized and every second space $356_2$-$356_n$ of the data spaces is designated as authorized. Those spaces other than the authorized spaces may comprise unauthorized spaces. The plurality of addressable spaces 355, 356 may therefore be partitioned into authorized and unauthorized spaces. The two sets may be complements of one another (such that the set of authorized spaces may comprise all addressable spaces that are not unauthorized and the set of unauthorized spaces may comprise all addressable spaces that are not authorized). As shown in FIG. 3, for illustrative purposes, every first space $355_1$-$355_{m-1}$ of the addressable control spaces, or control spaces, 355 is designated as unauthorized and every first space $356_1$-$356_{n-1}$ of the addressable data spaces, or data spaces, is designated as unauthorized.

As stated above, the authorized spaces may comprise those spaces having control over the functionality of the runtime of the IC 300 (and/or output component 390 coupled thereto), whereas the unauthorized spaces may comprise those with security-functionality (such as security-critical functionality) or access to security-critical content. Therefore, unrestricted reading from and/or writing to those "authorized" spaces may be prevented by designating them as part of the authorized subset. The unauthorized spaces may comprise those which, if mis-configured (e.g. if malware had access to) could cause irreversible damage and/or a malfunctioning to/of the IC 300 and/or the output component 390 and/or any further component (e.g. any peripheral components) to which then IC 300 is coupled. Additionally and/or alternatively, the unauthorized spaces may comprise those which, if accessed by malware, would facilitate some other kind of security breach of the system, such as persistently compromising the coupled processor, or performing unauthorized modification or exfiltration of the data passing through the interface 352. A specific but non-limiting example relating to audio will be given below. The authorized subset of spaces may therefore comprise those without security-critical functionality or with no access to security-critical content. In this way, if, during runtime of the IC 300, any malware should access the authorized spaces, it would not cause any damage and/or malfunction, irreversible or otherwise, to/of the IC 300. The partitioning of the set of spaces into the authorized and unauthorized subsets may therefore be done based on those spaces that, if malware had access to (e.g. during runtime), could cause damage/malfunction to/of the IC 300 and/or the output component 390 and/or any further component and those that could not.

The second interface 302 may provide a main processor access, during runtime, to the authorized subset of address ranges (in FIG. 3, every second control space $355_2$-$355_m$ and every second memory space $356_2$-$356_n$), e.g. those marked with an unlocked padlock. During runtime, the IC 300 therefore provides access (via the second interface 302) to those 'safe' set of address ranges, thereby providing the processor with runtime control of the IC 300 (and therefore of the output component 390) and since malware cannot cause damage/malfunction to/of the IC 300 if it had access to those address ranges, the IC 300 provides the processor with runtime control of the IC 300 in a safe and predictable way. On the other hand, the first interface 351 has access to each of the addressable spaces—e.g. both the authorized and unauthorized subsets. Therefore, whilst the second interface 302 only permits access to the subset of spaces designated as safe, the first interface 351 provides access to all spaces including those unauthorized spaces having security-critical functionality. Whilst the second interface 302 may be used to permit a main processor to access the IC 300 during runtime, the first interface 351 may be used to permit a secure MCU or embedded controller to access the IC 300 during boot or start-up (e.g. to load firmware onto the data spaces of the IC 300 during a secure boot). This will be explained further below. The IC 300 therefore provides a second signal path between the second interface 302 and the authorized subset of addressable spaces and a first signal path between the first interface 351 and each of the plurality of addressable spaces. The second interface 302 may therefore confer an ability to read and/or write from and/or to the authorized subset of address ranges, whereas the first interface 351 may therefore confer an ability to read and/or write from and/or to all of the address ranges (e.g. the first interface 351 permits full read and write access).

The setting of the address ranges, e.g. the partitioning, or designating, of the address ranges into an authorized and an unauthorized subset may be accomplished by, or via, a control module 340 (which may comprise a PAC unit). For example, the control module 340 itself may be configured to set an access permission for each of the address ranges, the access permission designating a particular address range, or set of address ranges, as authorized or unauthorized and via which interface the address range is accessible, as will be described below. As such, the authorized subset of address ranges may be designated by the control module 340 by designating a subset of address ranges only accessible by the first interface 351 (the unauthorized subset), with the authorized spaces comprising the remainder (e.g. those spaces not designated as unauthorized), since the authorized spaces are accessible via both interfaces 302, 351. In summary, the control module 340 may configure the unauthorized spaces (only accessible via the first interface 351), thereby designating the authorized spaces as comprising the remainder of the spaces.

The second interface 302 may be considered to be a restricted interface since it only permits access to a restricted subset of the address ranges, whereas the first interface 351 may be considered an unrestricted interface since it permits access to all of the spaces (e.g. the full set). Via the first interface 351, a processor may therefore be configured to get low-level access to the IC 300 hardware itself (e.g. for rebooting, controlling any status lights, recalibrating inputs etc.), such functionality is controlled through the unauthorized control and/or data spaces to which only the first interface 351 has access.

In one example, the IC 300 (e.g. the control module 340 thereof) may be configured to block a subset of the plurality of address ranges 355, 356. In this example, the IC 300 (or the control module 340 thereof) may create a blocked list of spaces, which may comprise those spaces not accessible via the second interface 302 and, therefore, the second interface 302 may be configured to access all the address ranges except those on the blocked list. In this example, the address ranges on the blocked list comprise those unauthorized spaces (with the locked padlock) in FIG. 3. Additionally or alternatively, the IC 300 (e.g. the control module 340 thereof) may be configured to allow a subset of the plurality of address ranges 355, 356, creating an allowed list which may comprise those address ranges only accessible by the second interface 302 and therefore the second interface 302 may be able to access those spaces on the allowed list, those spaces on the allowed list therefore comprising those authorized spaces (with the unlocked padlock), only accessible via the first interface 351. In each case, the allowed or blocked list may comprise those address ranges to which read and/or write access is allowed or blocked, respectively.

Details of the PAC module 340 will be set out with reference to FIG. 6, however the filter or gate 341 is configured to permit or deny the second interface 302 access to an addressable space in the following way. The filter 341 may comprise a secure filter. The PAC unit 340 may define the address ranges 355, 356 and their corresponding access permissions and, when a request (such as a read request or a write request) is sent through the second interface 302, the request being a request to access a given address range 355, 356 of the IC 300 (e.g. to read from and/or write to it), the PAC module 340 examines an associated access permission to determine whether the address range 355, 356 to which the request is associated is authorized or not (e.g. authorized to read from and/or write to it). If the given space is designated as authorized (e.g. associated to a read and/or write access permission) then the PAC module 340 is able to output an allow access signal to the filter 341 to allow the interface 302 access to the space (e.g. to read from it or to write to it); if not, then the PAC module 340 can either send no such signal or send a deny access signal. In this way access through the second interface 302 is allowed and/or denied by controlling the state of the gate (or filter or portal) 341, which is controlled by the PAC module 340 upon receiving a read or write request through the second interface 302. The filter 341 therefore comprises a gate that is configured to block and/or allow the access to the addressable locations of the IC 350 via the second interface 302. This will be further explained with reference to FIG. 6.

The address ranges may also be referred to registers or register spaces, e.g. (addressable) control registers or control register spaces, (addressable) data registers or data register spaces etc. Therefore, available only through the first interface 351 may be a set of control registers within a special subspace or set of address ranges (for example, a programmable access control module of the chip 300) that determine whether driver software executable by an external processor, connected to the IC 300 via the second interface 302, will have access a given subspace of the IC 300.

A table illustrating the access permissions possible through an IC according to this disclosure when compared with a prior art IC are illustrated in FIG. 4, the IC on the bottom row of the table is according to this disclosure and may comprise an IC as depicted in FIGS. 2A-2E or 3 above, or the figures below.

Figure 5:
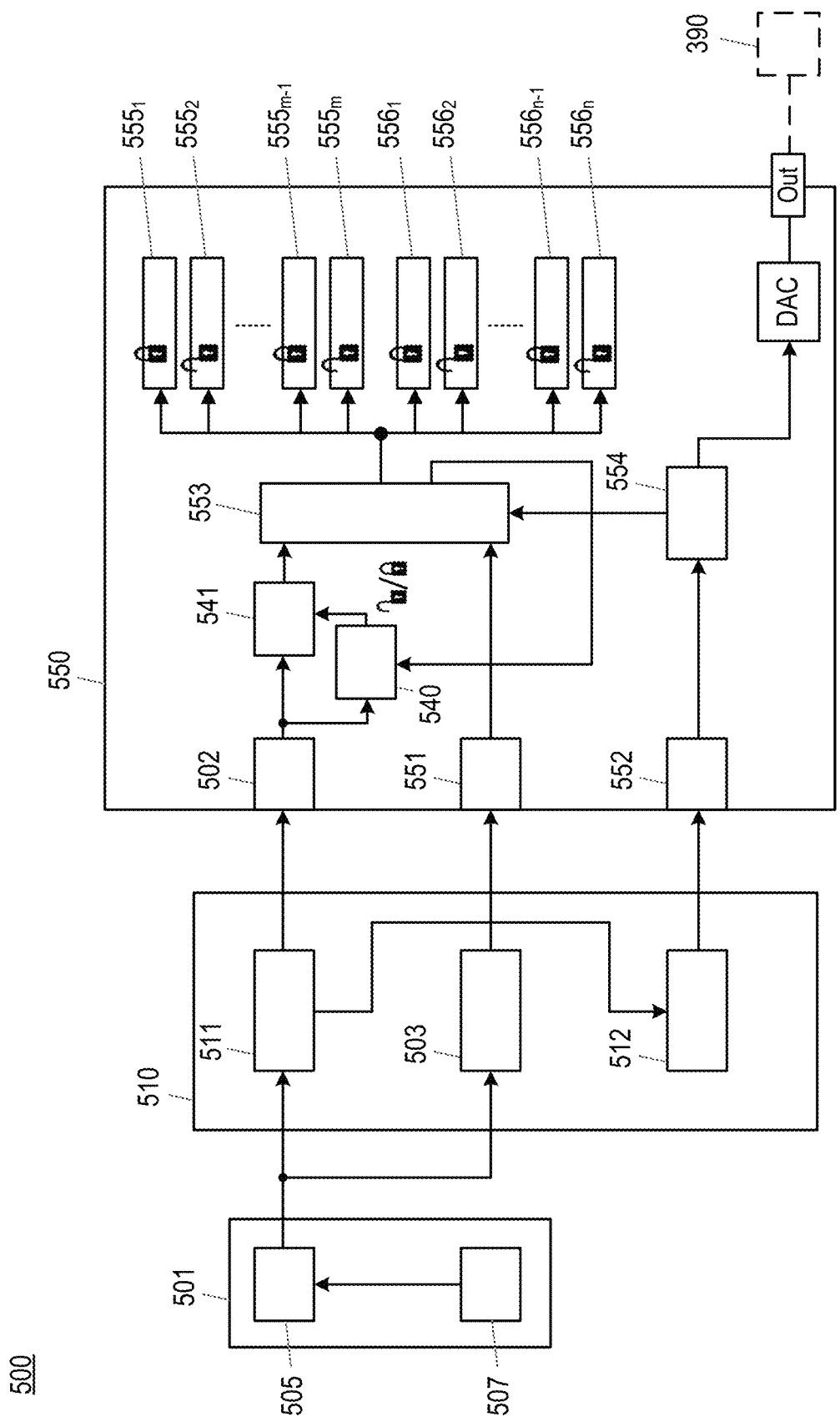
FIG. 5 is a simplified schematic diagram of an example system comprising an integrated circuit according to the disclosure.

FIG. 5 shows an example system 500 comprising a main processor 501, a set of motherboard components 510, and an IC 550. FIG. 5 provides one illustrative and non-limiting example of how an IC according to the present disclosure may be employed as part of a wider system. The IC 550 may comprise any of the ICs 250a-e or 300 as described above. With respect to the IC 550 (and elsewhere in this document) like features/elements will be denoted by like reference numerals and therefore the description of features described above will be omitted for brevity.

The processor 501 is a main processor and is external to the IC 550. As respectively indicated by blocks 505 and 507 the processor is configured to execute driver software 505 and application software 507. The motherboard 510 comprises a chipset, or PCH, 511, a secure MCU or embedded controller 503 and a codec 512 and the data interface 552 may comprise an I2S interface or the like. Although in some examples the IC 550 may not comprise a codec 512 and in these examples there may be a link directly from the chipset 511 to the data interface 552, and in such examples the data interface 552 may comprise a Soundwire™ interface. As shown in FIG. 5, the processor 501 communicates with the IC 550 via the chipset 511 and the second interface 502, via the chipset 511, the codec 512, and the data interface 552. The processor 501 may also be configured to transmit a signal to trigger the secure MCU (or embedded controller) 503. According to this example there is therefore a signal path between the processor 501, the chipset 511 and the second interface 502, a signal path between the processor 501, the chipset 511, the codec 512, and the data interface 552, and a signal path between the secure MCU 503 and the first interface 551.

In one example, the secure MCU 503 or embedded controller is configured to load the IC 550 at a very early stage of system boot, for example before the device driver 505 has started executing, and possibly before the processor 501 has started to boot. The trigger for the secure MCU or embedded controller 503 to start initializing the system, which may include loading and configuring the IC 550, may be either a signal from early stage boot firmware running on the processor (which may be long before the operating system, device driver and/or application software starts to execute), and/or may be a trigger from some other component in the system such as power management, and/or it may be inferred from the secure MCU 503 or embedded controller's reset circuitry sensing that it has been powered up and is out of reset (i.e. it initializes the system automatically as soon as it is powered-up and out of reset).

In another example, the processor 501, once fully booted and at runtime, is configured to re-initialize the circuitry within the IC 550—for instance, if the firmware running on the on-chip processor 554 encounters an unrecoverable error. In that case, the device driver 505 may be configured to transmit a signal via the chipset 511 to the embedded controller 503 to re-initialize the IC 550 (although this is not part of the normal boot). As the MCU 503 is impervious to malware, any malware running on the processor does not have access to the (unauthorized subset of) address ranges (if it did the IC 550 could be permanently damaged for example) and therefore the boot is secure. During runtime, the processor 501 has control over the authorized subset of address ranges of the IC 550 via the second interface 502 and the chipset 511. During boot or start-up, the processor 501 does not execute driver software 505 in that the driver software is not active and cannot therefore gain access to the IC 550 via the second interface 502. This may be achieved by the systems boot hardware and software. For example, IC 550 settings including that the processor 501 has access only to the authorized address ranges and/or no access to the unauthorized address ranges via the second interface 502 may be programmed into the IC 550 on boot/start-up, e.g. by firmware running on the secure MCU 503 or embedded controller. Alternatively, or in addition, executing firmware may cause the access restrictions to be imposed on the address ranges of the IC 550 (e.g. designated a subset as the authorized subset). For example, firmware running on the secure MCU 503 or embedded controller may dictate how the PAC unit 540 (or control unit 540) may set the address ranges and/or their respective access permissions such that a predetermined subset of the address ranges of the IC 550 are designated to be the authorized subset. The authorized subset may therefore be set, or designated, on boot/start-up, and may be set by the MCU 503. Following boot/start-up, control over the IC 550 is then passed to the driver software 505 (e.g. the processor 501 executing the driver software 505) (e.g. during runtime) which is free to access those authorized address ranges, which may have been set earlier. In this way the first interface 551, which has access to all of the address ranges of the IC 550 may be configured to set the access privileges of the spaces and define the authorized subset (e.g. the secure MCU 503 or embedded controller may configure the authorized subset via the first interface 551). It will be appreciated that the PAC unit 540 cannot be configured by the second interface.

The chipset may be configured to manage the data flow between the processor 501 and the IC 550. The codec 512 may comprise any codec (such as an HDA codec) and the processor 501 may be connected to the codec 512 via (for example) an HDA connection or connector. The codec 512 may be configured to encode and/or decode a signal (e.g. an audio signal). Although, in other examples (as described above) the system 500 may not comprise a codec 512 in which case there may be a link directly from the chipset 511 to the data interface 552 which may comprise a Soundwire™ interface.

Figure 6:
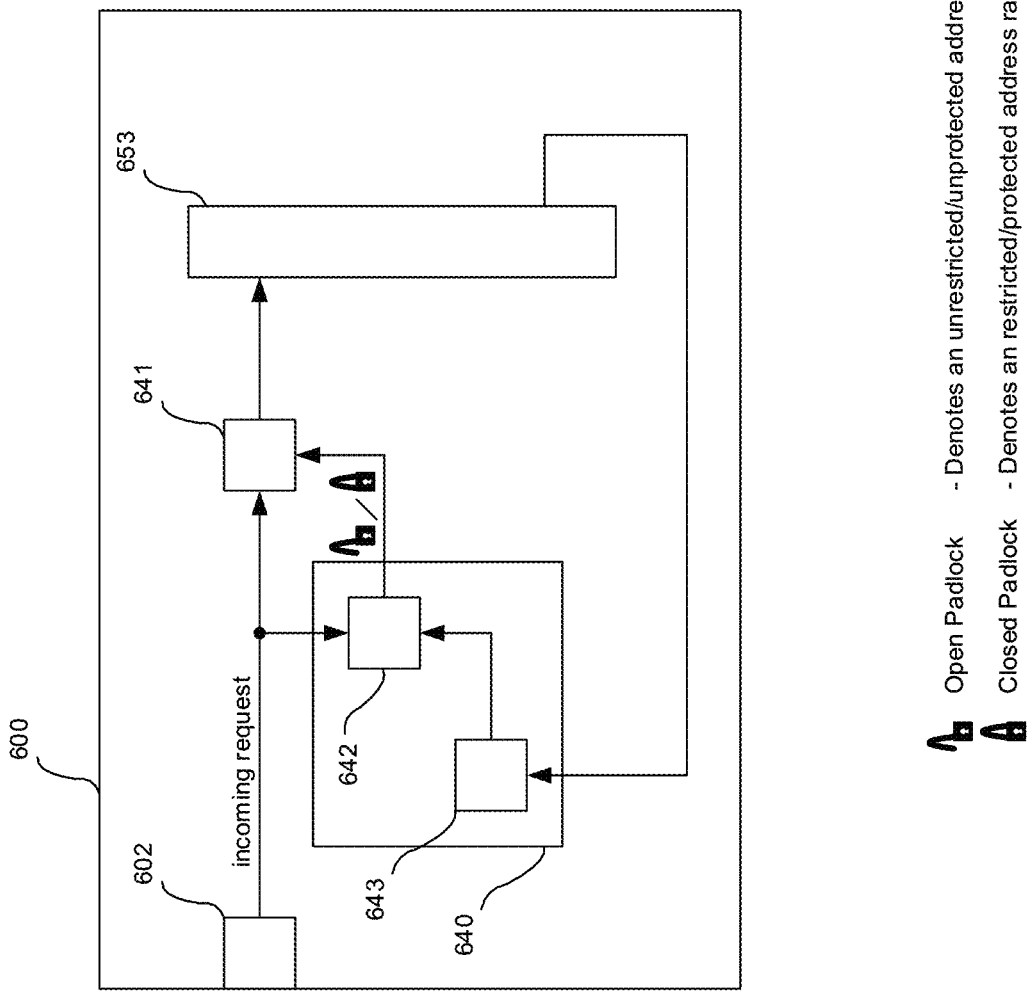
FIG. 6 is a simplified schematic diagram of an example control module for an integrated circuit.

FIG. 6 shows an example control module 640 which may comprise a PAC module 640. FIG. 6 only illustrates a simplified arrangement of an IC 600 wherein only the elements necessary for the following explanation are present and it should be understood that the other elements as illustrated in the IC's 300 and 550 have been omitted from FIG. 6 for reasons of clarity and brevity of the following explanation. Any of the control modules 340, 540 described above may comprise the module 640 according to the FIG. 6 example. The PAC module 640 is shown in combination with a filter/gate/portal 641 (which may comprise the filter 341 of the FIG. 3 example above) and bus 653 (which may comprise any of the buses 353, 553 as described above) and a restricted interface 602 (the same type of interface termed a second interface in examples previously described), these being components of an IC 600. The filter 641 may be configured to block or allow an access path from the restricted interface to the address ranges of the IC 600. The filter 641 is therefore configured to gate (allow/block) access to addressable locations within the IC via the first interface 602.

The PAC module 640 in this example may comprise hardware and/or software and may be configured to signal to the filter 641 whether to block or allow a particular access request (see the "incoming request" label in the figure) as will be described below. The module 640 may be configured to transmit an "allow_access" signal to the filter 641. The filter 641 may therefore be referred to as a secure filter/gate/portal 641 and may be for controlling access to, and also protecting, the address ranges of the IC.

The PAC module 640 comprises a policy table 643 and an auditing module 642. The policy table 643 may comprise hardware and/or software and may comprise a data structure storing one or more access policy entries. Specifically, the table 643 may store an access permission for each space of the IC and/or the table 643 may store a definition of an address range alongside a corresponding access permission. For example, each entry may define a logical block/region corresponding to one of the address ranges/locations/registers within the IC's addressable locations and the access permissions associated for that address range. In this way, the subset of authorized address ranges may be set, or designated, or programmed, by setting associated access permissions for those address ranges in the policy table. Put another way, the policy table may designate an address range as either AUTHORIZED or UNAUTHORIZED and the authorized subset of address ranges may be those for which the access permission is AUTHORIZED. An AUTHORIZED designation may comprise an access permission to read only from, write only to and/or read and write from/to a particular address range.

The incoming request via the first interface 602 comprises information which may comprise the details of an incoming request from an external entity (e.g. an external processor) to an address range within the integrated circuit 600. The access information, or request, may comprise one or more address (e.g. a discrete address), the type of the request (e.g. read only, write only, or read and write), and the data to be read from the said address in the example of a read request or the data to be written into the said address if it is a write request, etc. Via the second interface 602, an access request containing a address to be accessed (read from or written to) is received. The audit module 642 may comprise hardware and/or software (e.g. a comparator and/or combinatorial logic and/or a validator and/or a validation mechanism/logic, and/or any hardware and/or software configured to validate a transaction against the policy table) and may be configured to compare the incoming access information, e.g. an address or addresses, to the information, e.g. an address range, in the policy table and to determine whether to allow or block the request. Specifically, the audit module 642 may be configured to compare the address pertaining to the request that an external entity is attempting to access via the second interface 602 against a corresponding entry in the policy table for that address range which the requested address is within so as to check the access permission. If the access permission for that address range is designated as AUTHORIZED (that space thereby being part of the authorized subset) (e.g. authorized to read/write) then the audit module 642 is configured to transmit an "allow_access" signal to the filter 641 which will cause the filter to allow the access request (to read/write). If the address range does not have the correct access permission, then no such signal is sent to the filter 641 and therefore the request is denied. With reference back to FIG. 5, the read or write access request may be created by the chipset and transmitted to the IC via the first interface 602. The audit module 642 is therefore configured to validate a transaction against the policy table.

In the FIG. 6 example it will be appreciated that the first (unrestricted) interface (not shown) has access to the bus 653.

The configuration of the IC 600 and/or the control module 640 thereof may be lockable. For example, the IC 600 and/or module 640 thereof may comprise logic (such as gating logic in the form of a logic circuit) such that, when activated, further writes to the policy table 643 and/or changing the state of the gate 641 are prevented. To activate the logic circuit a signal may be received via the interface 602 (and via the bus 653 etc., e.g. via the line from the bus 653 to the policy table 643). The logic circuit, when activated, prevents write access to the policy table 643 and prevents write access to an enabled part of the gate 641 (the enabled part switching the gate 641 ON).

Figure 7:
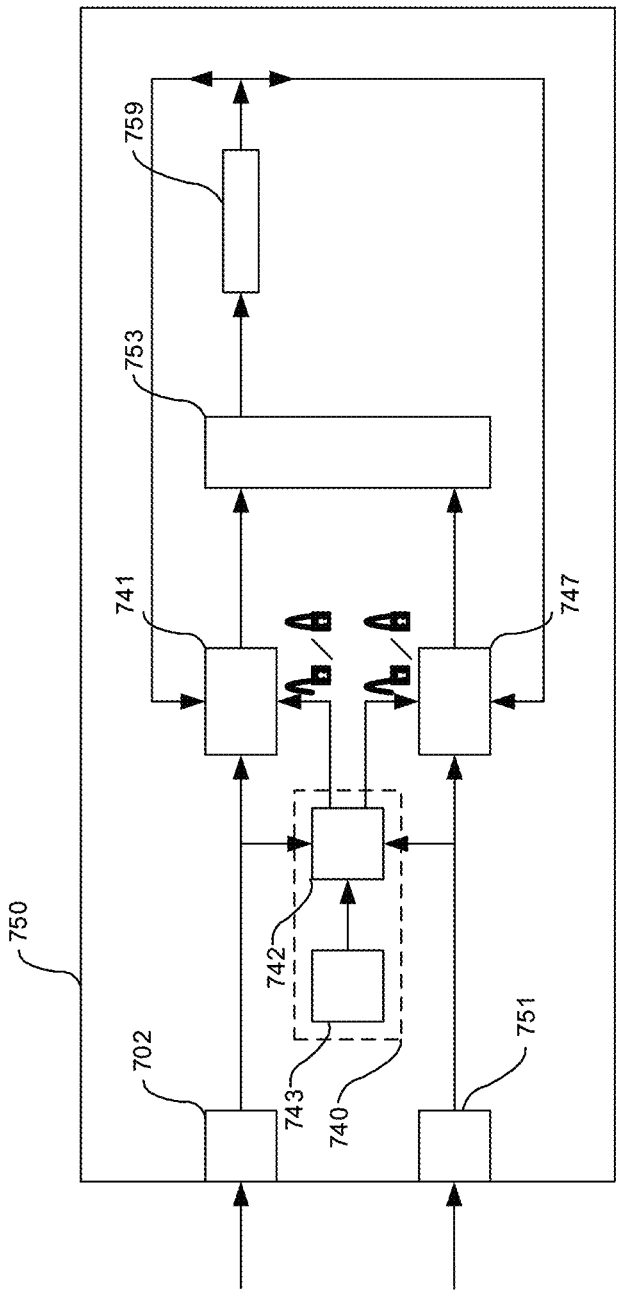
FIG. 7 is a simplified schematic diagram of an example integrated circuit.

FIG. 7 shows another example IC 750. Likewise FIG. 7 only illustrates a simplified arrangement of an IC 750 wherein only the elements necessary for the following explanation are present and it should be understood that the other elements as illustrated in the IC's 300 and 550 have been omitted from FIG. 7 for reasons of clarity and brevity of the following explanation. the IC 750 of this example comprises a PAC module 740 comprising a policy table 743 and an audit module 742. These components are as described above with respect to FIG. 6. In the FIG. 7 example however, each interface 702, 751 is associated with its own gate, such that The IC 750 comprises a first gate 747 associated with the first interface 751 and a second gate 741 associated with the second interface 702 (each gate, e.g. an address gate, may comprise a secure filter, e.g. a secure address filter). Each one of the first and second gates 741, 747 may be as described above with respect to the filter 641 of FIG. 6. In this way, via the mechanism as described above, in the case that both gates 741, 747 were in an ON state, then each interface 702, 751 may function as the second (restricted) interface, as described above in the FIG. 6 example. However, by switching the gate in the OFF state, the interface associated with that gate may thereby be designated as the first (unrestricted) interface since, by virtue of the gate being OFF, the first interface has no restrictions on its access to the ICs addressable locations, effectively because the access permissions in the policy table are not being implemented because the gate is off. Therefore, the FIG. 7 IC 750 is an example comprising configurable interfaces, each hence being configurable (or designatable) as the second (restricted) or first (unrestricted) interface. An MCU may designate each interface of the IC 750 to be a restricted or unrestricted interface and may do so by turning the filter that is to be associated with the unrestricted interface OFF.

For this purpose, the IC 750 comprises an addressable control register 759 which may be to control the ON/OFF state of each one of the filters 741, 747. Therefore, via access to the addressable control register 759 (e.g. via a MCU) the IC 750 may be configured by designating one of the interfaces 702, 752 as unrestricted by switching off its associated gate 741, 747. In one example, the IC 750 (more specifically, the interfaces thereof) may comprise a default configuration according to which each filter is ON and each interface is therefore a second (restricted) interface or may comprise a default configuration according to which each filter is OFF and each interface is therefore a first (unrestricted) interface. In this example the IC 750 may be configured by virtue of (standard) register access to the space 759. In another example, the IC 750 may comprise a default configuration according to which one or more interfaces have the filter OFF and one or more interfaces have the filter ON; this configuration may be advantageous. The IC 750 may be configured by virtue of non-volatile memory such as OTP-memory to designate which interface is restricted and which is unrestricted. Effectively, therefore, OTP may define the configuration of the IC 750 out of reset, such that OTP effectively provides flexible configuration of the required default settings of the IC 750 (e.g. to any of those default configurations described above).

One advantage of being able to configure which interfaces are restricted and unrestricted is that it allows the end user to select the interface configuration that best suits the layout of their system requirements so that components external to the IC 750 can be optimised in terms of their placement and signal routing.

Figure 8:
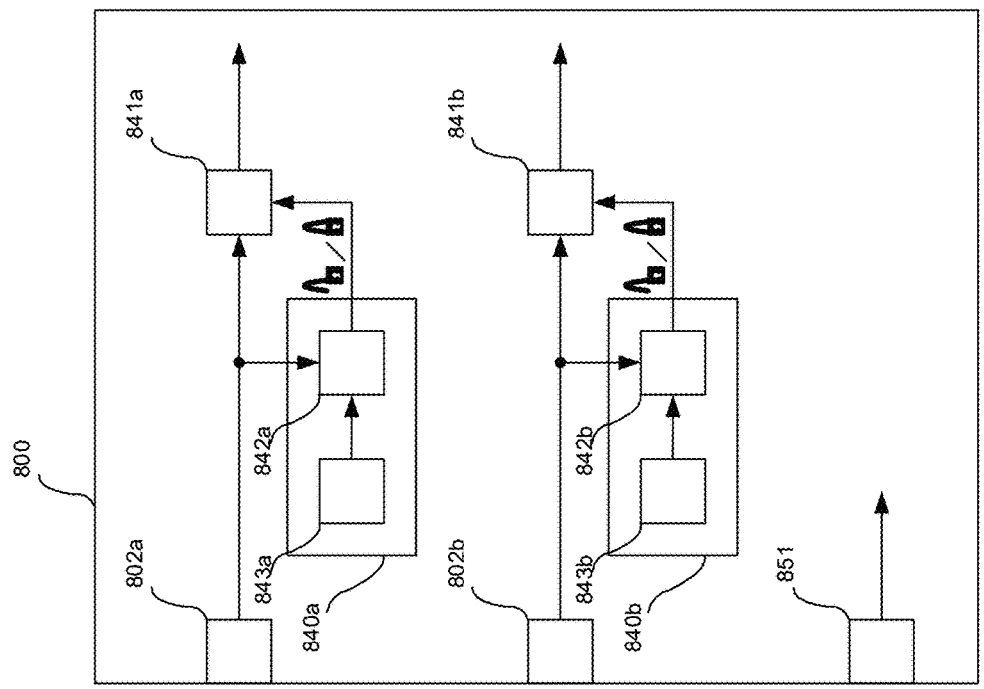
FIG. 8 is a simplified schematic diagram of an example integrated circuit.

FIG. 8 shows an example IC 850 comprising a plurality of second (restricted) interfaces 802a and 802b (two are shown in FIG. 8). Again FIG. 8 only illustrates a simplified arrangement of an IC 800 wherein only the elements necessary for the following explanation are present and it should be understood that the other elements as illustrated in the IC's 300 and 550 have been omitted from FIG. 8 for reasons of clarity and brevity of the following explanation. Each second interface 802a,b is shown associated with its own filter/gate/portal 841a,b and PAC module 840a,b (each comprising a respective policy table 843a,b and audit module 842a,b). Each filter 841a,b may be configurable in an ON and OFF state such that either one of the interfaces 801a,b may be configurable as the restricted or unrestricted interface (although in the FIG. 8 example they are both depicted as second, restricted, interfaces, with one unrestricted interface 851 being shown). Since each of the second interfaces 802a,b is associated with a policy table 843a,b, this provides an example where each restricted interface permits access to a different authorized subset of address ranges of the IC 800. For example, the second interface 802a may permit access to a first authorized subset of address ranges and the first interface 802b may permit access to a second authorized subset of address ranges. The first and second subsets may be different but one may be a subset of the other (e.g. the first subset may be a subset of the second subset) and, in this way, the interfaces 802a,b permit nested access to an authorized subset of the address ranges. Of course, in some examples, a plurality of first interfaces may be associated with the same policy table and hence may permit access to the same authorized subset of the address ranges.

Advantages of the disclosure are as follows. Whereas prior art ICs only provide basic ON/OFF functionality to a processor during runtime of the IC or may be insecure in that malware on the host has unrestricted access such that it may compromise the integrity or security of the IC and system, according to the present disclosure, the IC of the present disclosure comprises at least two interfaces (e.g. control interfaces) providing asymmetric access permissions to any entity (e.g. the processor) coupled to the IC via the interfaces. Whereas in the prior art, the processor has no access to the address ranges of the IC and cannot therefore control the IC (and/or therefore an output component connected to the IC) beyond turning it on and off, the IC of the present disclosure comprises a designated subset of the address ranges of the IC deemed safe for the processor to access during runtime of the IC. Therefore, the processor has runtime control of the IC and can control those functions of the IC or output device that are not a threat to security in that even if malware had access to those authorized address ranges of the IC, no damage would result to the IC or to the output component. An IC according to this disclosure therefore provides a processor with runtime control of the IC in a safe and secure way without significantly increasing the footprint of, or the cost to manufacture, the IC.

Figure 9:
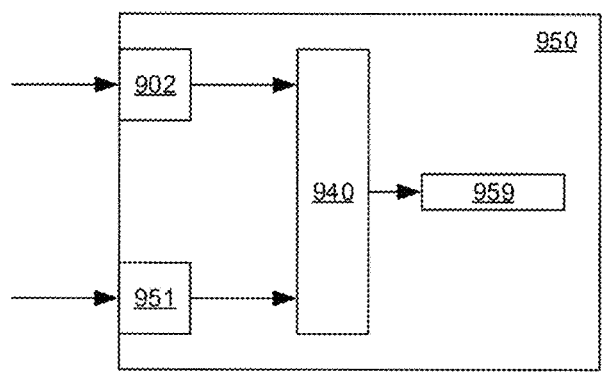
FIG. 9 is a simplified schematic block diagram of an example integrated circuit.

By way of a summary of the examples of the disclosure presented so far, FIG. 9 shows a schematic of an example integrated circuit comprising a first interface 951 and second interface 902, an internal addressable space 959 comprising a plurality of address ranges, and a control unit 940. Each of the first and second interfaces 951, 902 is coupled to the internal addressable space 959 via the control unit 940. The control unit 940 is configurable in a first state in which the control unit 940 is configured to allow or deny the second interface 902 access to a subset of the plurality of address ranges of the internal addressable space. The control unit 940 may comprise any of the features as described above with reference to other figures. For example, the control unit 940 may comprise a gate and audit module, and store a policy table etc. such that allowing or denying the second interface 902 access to the subset may be achieved through the use of the audit module and gate, allowing/denying access according to the policy table.

Figure 10:
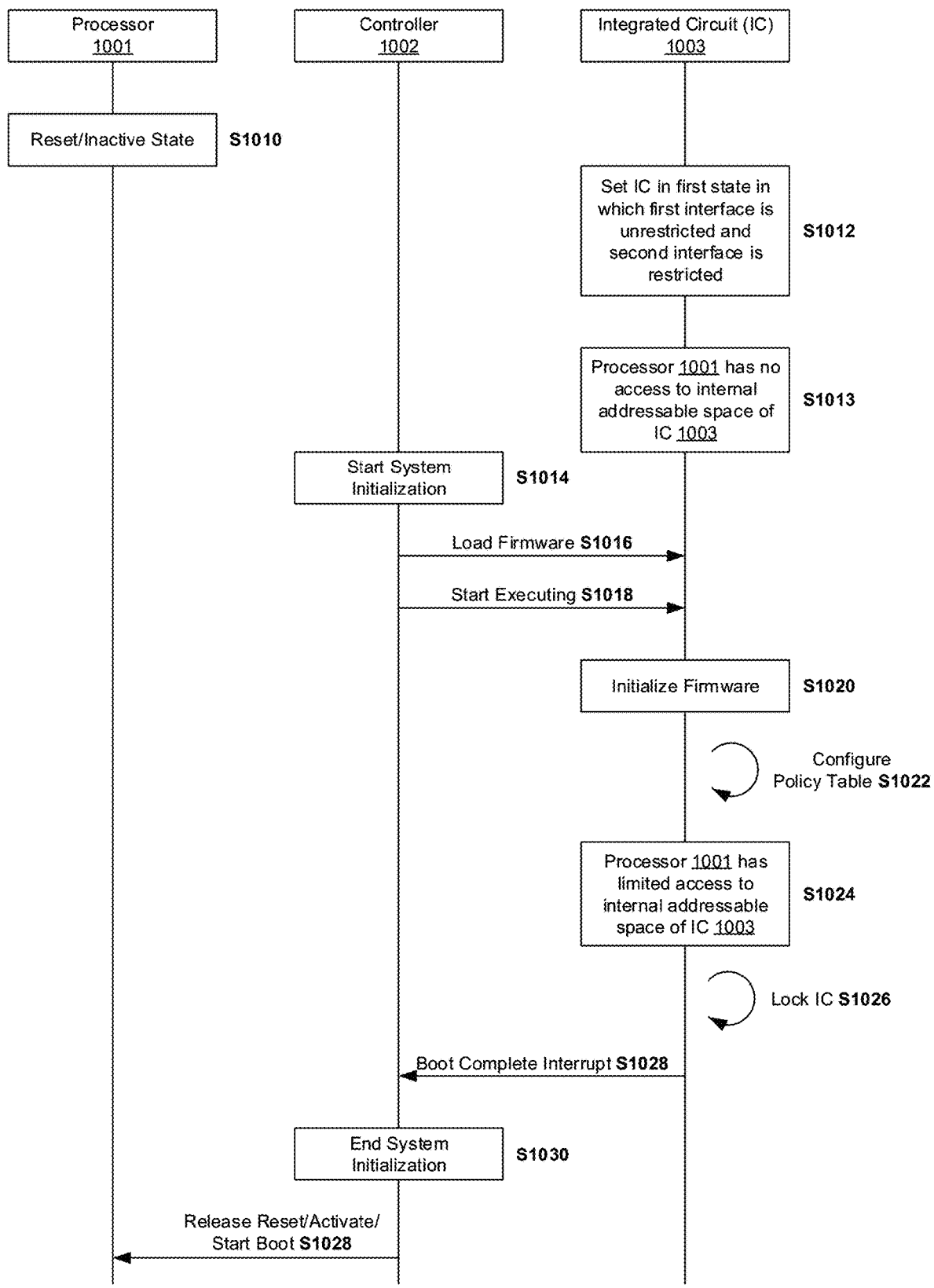
FIG. 10 is a sequence diagram showing an example boot sequence for the integrated circuit of any of the FIG. 1-9 examples.

FIG. 10 is a sequence chart illustrating the flow of an example boot sequence for an integrated circuit. As illustrated in FIG. 10, a processor 1001 (e.g. the processor 501 in the FIG. 5 example) is in an inactive state or a reset state (S1010) and an integrated circuit 1003 (e.g. any of the integrated circuits as described above) is configured in a state in which one of its interfaces is restricted (S1012) (e.g. the "first state" as described above relative to other examples). For example, at S1012, the integrated circuit 1003 (e.g. the control unit thereof) may be configured in its state by a OTP operation (e.g. that sets the gate of the control unit to be ON as described above). As a result, one interface is restricted in that it has access to a subset of a plurality of address ranges of the IC 1003, not the full set. As indicated at S1013, the processor 1001 does not have access to the internal addressable space of the IC 1003. At S1014, a system initialization operation commences by a controller 1002 (e.g. the controller 503 of the FIG. 5 example) where the IC is securely loaded with firmware and configured for runtime control by the processor 1001, which is inactive at this stage of the sequence. The operation S1014 comprises the controller 1002 loading firmware (S1016) into the control registers of the IC 1003 and executing (S1018) the loaded firmware. The controller 1002 loads the firmware via the first interface of the IC 1003 since the first interface has unrestricted access to the internal addressable space of the IC 1003 (including the control register thereof) at this stage. At S1020 the IC 1003 initializes the firmware which may comprise configuring the policy table (S1022). Configuring the policy table may comprise writing at least one access permission for at least one address range of the IC 1003. Writing an access permission may comprise defining an address range to which access is to be permitted or defining an address range to which access is to be prevented. Therefore, the policy table may comprise at least one permission associated with at least one address range, the permission defining whether access is to be permitted or prevented, via the second interface. Therefore, the subset of address ranges to which the second interface has access, defined by respective access permission(s) stored in the policy table, may be configured at S1022 and may be configured upon initialization of the firmware. Therefore, following S1022, at S1024, the processor 1001 has limited (restricted) access, being access to only a subset of address ranges as defined by the policy table configured at S1022. Optionally, the configuration of the IC 1003 may be locked (S1026). This may comprise preventing further write of the policy table (e.g. a write lock) and may be achieved through logic in the IC 1003 that prevents a potential request to write the policy table from being completed. In any case, the IC may be configured such that the policy table is locked in a non-reversible manner until reset of the IC. Therefore, the IC may comprise a write lock preventing modifications to the policy table, and the write lock may be non-reversible until the IC is reset. The process is then completed (S1028) and the system initialization is complete (S1030). Thereafter, the processor 1001 has control of the IC 1003 via the second interface (S1032).

Examples thus far have disclosed an integrated circuit comprising two interfaces, one of which is permitted restricted access, e.g. access to a subset, of an integrated circuit's address ranges through which a processor can have runtime control over the IC, and another of which has unrestricted access for configuring the IC. Examples will now be described which relate to an integrated circuit comprising one interface which is initially unrestricted but through which the integrated circuit is configured such that access via the interface becomes restricted, e.g. to a subset of the plurality of address ranges. In these examples, a single interface therefore has unrestricted and restricted states.

Figure 11:
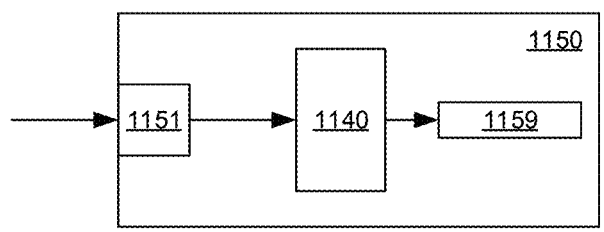
FIG. 11 is a simplified schematic block diagram of an example integrated circuit.

FIG. 11 discloses, schematically, an example integrated circuit 1150. The IC 1150 comprises an internal addressable space 1159 which comprises a plurality of address ranges, a control unit 1140 configurable in a first state and a second state, and an interface 1151 coupled to the internal addressable space 1159 via the control unit 1140. When the control unit 1140 is configured in the first state, the interface 1151 has unrestricted access to the plurality of address ranges via the control unit 1140 and, when the control unit 1140 is configured in the second state, the interface 1151 has access to a restricted subset of the plurality of address ranges via the control unit 1140. When the control unit 1140 is configured in the first state, the control unit 1140 is configurable via the interface 1151 to be in the second state. In other words, through the IC of the FIG. 11 example, a processor (such as the processor 1001) is allowed initial unrestricted access to the address ranges and subsequent restricted access to the address ranges. For example, when the control unit 1140 is in the first state and the access is unrestricted, an external processor may load firmware into the control registers of the IC 1150 and may subsequently designate a subset of the address ranges to define a restricted subset to which the processor is allowed access during runtime/when the main operating system starts to initialize and when the control unit 1140 is in the second state. The transition from the first state to the second state may be one-way in that it is irreversible until the IC is reset, and a transition from the second state to the first state is not possible (without resetting the IC). This will be explained in further detail below.

To illustrate the principles of the examples where, through a "single interface" (interface 1151), an external processor can both configure the IC and then have runtime control over it, FIG. 11 shows only that single interface 1151. However, it is to be understood that in the FIG. 11 example, and also for subsequent examples that show only one interface (e.g. FIGS. 12 and 13) that the IC may comprise other interfaces (e.g. as shown in FIG. 9). In these examples, any "other" interface (e.g. a second interface) may be off or not connected. In other examples, any "other" interface (e.g. a second interface) may be configured in a manner same to the interface 1151 and so maybe unrestricted or restricted etc. Therefore, even in examples where only a single interface is depicted this is for explanatory purposes only; other interfaces other than that/those shown may be present in the IC.

Figure 12:
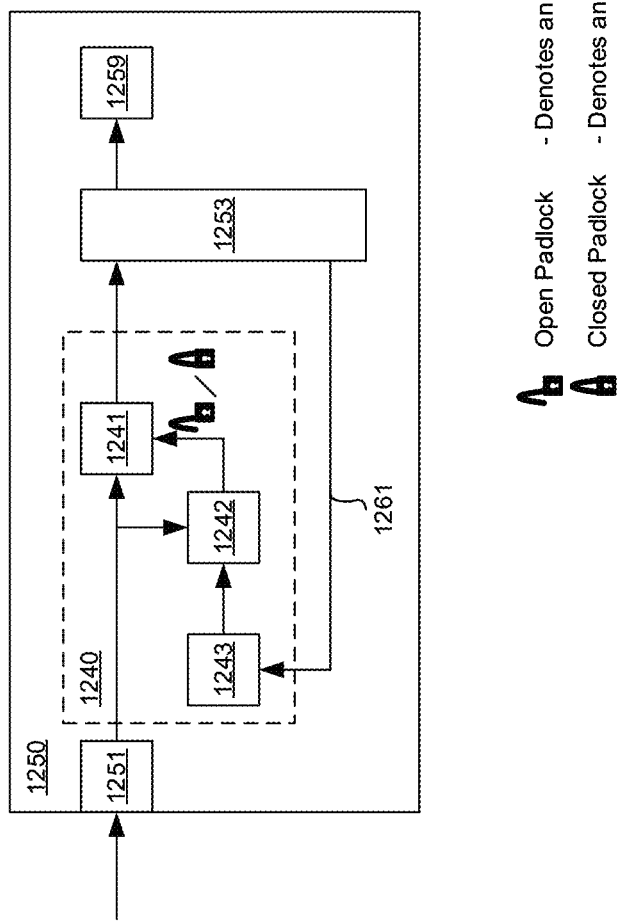
FIG. 12 is a simplified schematic block diagram of an example integrated circuit.

FIG. 12 shows an example IC 1250, such as the IC 1150 where like features/elements will be denoted by like reference numerals and therefore the description of features described above will be omitted for brevity. As for the IC 1150, the IC 1250 comprises a control unit 1240 which, in this example, comprises a gate 1241 (which may also be termed a filter), an audit module 1242, and a policy table 1243. The IC 1250 also comprises a bus 1253 and an addressable space 1259 comprising a plurality of address ranges. These components 1241, 1242, 1243, 1253, and 1259 may be as described above with respect to the earlier figures. Furthermore, although not shown for brevity, the IC 1250 may comprise other components such as an internal processor, a data interface, a DAC, and/or an output component (e.g. see FIG. 5), depending on the example.

The policy table 1243 is configured to store an access permission for the internal addressable space 1259 which defines the restricted subset of the plurality of address ranges to which the interface 1251 has access when the control unit 1240 is configured in its second state. Therefore, when the control unit 1240 is configured in the first state, the access permission is writable to the policy table 1243, via the interface 1251 (see the line from the bus 1253 indicated by 1261).

The gate 1241 has an ON state and an OFF state. The interface 1251 is coupled to the internal addressable space 1259 via the gate 1241 (and via the bus 1253). When the control unit 1240 is configured in the first state, the gate 1241 is configured in the OFF state, and when the control unit 1240 is configured in the second state, the gate 1241 is configured in the ON state. When the control unit 1240 is configured in the first state, the state of the gate 1241 is settable via the interface 1251. Changing the state of the gate from OFF to ON will transition the control unit 1240 from its first to its second state.

For an incoming access request from a (not shown) processor via the interface 1251 to access at least one address of the plurality of address ranges, the audit module 1242 is configured to access the policy table 1243 to determine an access permission associated with the at least one address and to transmit a signal to the gate 1241. The gate 1241, when in the ON state, is configured to, on receipt of the signal from the audit module 1242, adopt a configuration according to which the received access request is allowed or denied depending on the access permission associated with the at least one space.

As described above with respect to FIG. 5, the policy table 1243 may designate an address range as either AUTHORIZED or UNAUTHORIZED and the restricted subset of address ranges may comprise an authorized, or approved, subset of address ranges. The subset of address ranges may be those for which the access permission is AUTHORIZED. An AUTHORIZED designation may comprise an access permission to read only from, write only to and/or read and write from/to a particular address range.

An incoming request via the interface 1251 comprises information which may comprise the details of an incoming request from an external entity (e.g. an external processor) to an address range within the integrated circuit 1250. The access information, or request, may comprise one or more addresses (e.g. a discrete address), the type of the request (e.g. read or write), and the data to be read from the said address in the example of a read request or the data to be written into the said address if it is a write request, etc. Via the interface 1251, an access request containing an address to be accessed (read from or written to) is received. The audit module 1242 may comprise hardware and/or software (e.g. a comparator and/or combinatorial logic and/or a validator and/or a validation mechanism/logic, and/or any hardware and/or software configured to validate a transaction against the policy table) and may be configured to compare the incoming access information, e.g. an address or addresses, to the information, e.g. an address range, in the policy table and to determine whether to allow or block the request. Specifically, the audit module 1242 may be configured to compare the address pertaining to the request that an external entity is attempting to access via the interface 1251 against a corresponding entry in the policy table for that address range which the requested address is within so as to check the access permission. If the access permission for that address range is designated as AUTHORIZED (that space thereby being part of the authorized subset) (e.g. authorized to read/write) then the audit module 1242 is configured to transmit an "allow_access" signal to the gate 1241 which, when the control unit 1240 is in the second state and therefore when the gate 1241 is ON, will cause the gate 1241 to allow the access request (to read and/or write). If the address range does not have the correct access permission, then no such signal is sent to the gate 1241 and therefore the request is denied. The audit module 1242 is therefore configured to validate a transaction against the policy table 1243 when the control unit 1240 is in the second state.

In other words, the first state of the IC 1250 may comprise an (unrestricted) state in which access to the plurality of address ranges is unrestricted via the sole interface 1251. But, in this state, it is possible to configure the IC 1250 in another (restricted) state in which access to the plurality of address ranges is restricted (restricted to an allowable or authorized subset). Once in this restricted state the IC 1250 may be prevented from transitioning back to the unrestricted state. Configuring the control unit 1240 (and therefore the IC 1250) into this second (or restricted) state may comprise, in a first example, configuring the policy table 1243, in a second example, switching on the gate 1241, or in a third example, both configuring the policy table 1243 and switching on the gate 1241. These examples will now be described in further detail.

In the first example, configuring the policy table 1243 may place the control unit 1240 in its second (restricted state). The policy table 1243 may provide no access to the address ranges of the IC in a default state, once configured, the policy table 1243 may define an access permission that designates the subset of the address ranges that is accessible, e.g. permitted address ranges. Therefore, the policy table 1243 in this example comprises an allow-list and the second state of the control unit 1240 may correspond to access being according to the allow-list. Alternatively, the policy table 1243 may comprise a block-list and the second state of the control unit 1240 may correspond to access according to the block-list. According to the block-list example, a 'default' policy in the policy table may place no limitations or restrictions on the address ranges that are accessible via the interface 1251. Placing the control unit 1240 in the second state comprises writing a policy to the policy table 1243 that designates a subset of the address ranges as inaccessible (e.g. the control registers of the IC 1250), the complement of that subset being the restricted subset to which access is permitted via the interface 1251 when the control unit 1240 is in its second state. In some examples, the policy table 1243 may define a mixture of access permissions such that access is permitted to a first subset of address ranges but denied to a second subset of address ranges etc.

In the second example, turning the gate 1241 ON may place the control unit 1240 in its second (restricted state) because, once the gate 1241 is ON, access to the internal addressable space will be according to the policy stored in the table 1243, which may already be written to the table 1243. Or, the policy table may comprise a block-list in which case turning the gate 1241 ON will block all access to the address ranges of the IC. Therefore, by turning the gate 1241 ON, the audit module 1242 will prevent and allow access to the address ranges according to the policy table 1243, however it is configured.

In the third example, placing the control unit 1240 in its second (restricted) state comprises configuring the policy table 1243 and turning the gate 1241 ON as described above.

Therefore, in one example, in the first state the gate 1241 is OFF, and the OFF state of the gate 1241 represents the default state of the gate 1241. In this example the policy table 1241 may be blank. However, in the first state the control unit 1240 is configurable into the second state. This may involve an initialisation process performed by an external processor which configures the policy table 1243 and/or sets the gate to be ON. This control unit 1240 may exist in this state until the IC 1250 is reset in which case the registers may default to 0.

Writing access permissions to the policy table can be performed directly by an external processor (such as an application processor) since when the gate 1241 is turned OFF, the interface 1251 is unrestricted (when the control unit 1240 is in the first state) and therefore the processor has direct access to write the policy table 1243 entries itself. Also, while the control unit 1240 is in the first state, the processor is able to turn the gate ON (e.g. by a register write). When the control unit 1240 is in its first state an external processor has access to the registers of the IC 1250 necessary to write the policy table 1243 and/or to change the state of the gate 1241. Therefore, when the control unit 1240 is in its second state, the subset of address ranges to which the interface 1251 has access does not include those registers. In this way, when the processor configures the control unit 1240 in the second state it essentially prevents itself from subsequently modifying the policy table 1243 and/or changing the state of the gate 1241. This is why, in some examples, transitioning back to the first state is only possible via resetting the control unit 1240 and/or the IC 1250 and/or the processor (the processor will be discussed with reference to FIGS. 13 and 14).

As stated above, in the first state, the unrestricted access to the address ranges allows an external processor to write firmware to a processor inside the IC, set the firmware to execute, and initialise the phase of that integrated firmware to write (an access permission to) the policy table 1243 and/or set the gate 1241 to ON. Furthermore, in the first state the IC 1250 may be lockable to prevent further writes to the policy table 1243 and/or changing the state of the gate 1241 such that neither can be changed until reset as discussed above. To be locked in this way, the IC 1250 (e.g. the control unit 1240 thereof) may comprise logic (such as gating logic in the form of a logic circuit) such that, when activated, further writes to the policy table 1243 and/or changing the state of the gate 1241 are prevented. To activate the logic circuit a signal may be received via the first interface 1251 (and via the bus 1253 etc., e.g. via the line identified at 1261). The logic circuit, when activated, prevents write access to the policy table 1243 and prevents write access to an enabled part of the gate 1241 (the enabled part switching the gate 1241 ON). The lock is irreversible until reset of the IC and therefore the logic circuit, once configured such that write access to the policy table 1243 and/or the enabled part of the gate 1241 is prevented, may only be configurable such that the write access is permitted again upon reset of the IC. In other examples, the lock may be non-volatile.

In these examples, since the policy table 1243 and the state of the gate 1241 may be cleared/changed upon reset, the policy table 1243 and gate 1241 comprise volatile memory. However, in other examples the policy table 1243 and the gate 1241 may comprise non-volatile memory in which case, once programmed, they are not changeable upon reset. The lock may also be a non-volatile lock.

The restricted subset of the plurality of address ranges (e.g. those on an allow-list etc.) excludes configuration registers for the control unit 1240 so that whilst a processor has unrestricted access to the address ranges when the control unit 1240 is in its first state (e.g. so that the processor can load firmware into the IC 1250), in the second state, the processor cannot access those registers which could re-configure the policy table 1243, change the state of the gate 1241 and/or lead to damage if accessed by malware. For this final reason, an external processor is permitted to have runtime control over the IC 1250 when the control unit 1240 is in the second state.

The IC 1250 may comprise additional interfaces, for example as depicted in FIG. 8. In these examples, the IC 1250 comprises a plurality of interfaces and the interface 1251 is a first interface. Each interface of the plurality may be associated with a respective control unit in the manner described above, or a plurality of interfaces may be associated with the same control unit. In either example, each interface may configure the control unit to be in its second state (e.g. by configuring the policy table and/or switching on the gate as described above) and therefore the unrestricted access to the address ranges (when the control unit is in its first state) and subsequent restricted access to the address ranges (when the control unit is configured in its second state) may be possible through a plurality of interfaces of the IC.

Figure 13:
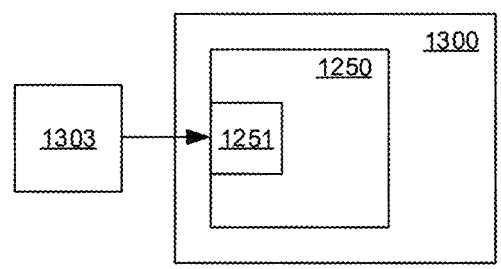
FIG. 13 is a simplified schematic diagram of an example system comprising an integrated circuit according to the disclosure.

FIG. 13 shows a system 1300 comprising a processor 1303 in association with the IC 1250 to illustrate some advantages of the FIG. 12 example. In this example, the processor 1303 has a first and a second state that respectively correspond to the first and second state of the control unit of the IC 1250.

The processor 1303 is connected to the interface 1251 and therefore has access to the address ranges of the IC 1250 via the interface 1251. As above, this access is initially unrestricted (e.g. to all of the plurality of address ranges) when the control unit of the IC 1250 is in its first state, but is subsequently restricted (e.g. to a subset) by configuring the control unit of the IC 1250 in its second state. The processor 1303 comprises first and second states that define how the processor 1303 interacts with the IC 1250 depending on the state of the control unit. When the processor 1303 is configured in the first state it is configured to execute bootloader firmware. Therefore, the first state of the processor 1303 corresponds to the first state of the control unit since, to execute bootloader firmware, the processor 1303 requires unrestricted access to all of the address ranges of the IC 1250, including the control registers. In other words, the processor 1303 executing its bootloader firmware includes loading and starting execution of firmware in the IC 1250, which is why access to the IC 1250 is unrestricted at this stage. When the processor is configured in the second state it is configured to initialise and execute an operating system. Therefore, the second state of the processor 1303 corresponds to the second state of the control unit since in the execution of an operating system, should any malware have access to the address ranges of the IC 1250 they could potentially cause harm, and therefore the processor's access to the IC 1250 in the second state is restricted to those address ranges that are not security critical. As such, the subset of address ranges to which the processor 1303 is allowed access when in its second state (and when the control unit is in its second state) excludes security-critical control registers for the IC 1250. In other words, the processor 1303 may access certain control registers for the IC 1250 that are not security-critical but is excluded from accessing control registers for the host interface security features (e.g. those concerning the policy table, the gate activation etc.).

When the processor 1303 is configured in its first state it is configured to cause the control unit 1240 to transition from its first state to its second state. As described above this may include, the processor 1303 causing an access permission to be written to the policy table defining a policy according to which access to the address ranges is restricted and/or this may include the processor 1303 causing the gate to switch to its ON configuration. Therefore, when the processor 1303 is configured in its first state it may be configured to write an access permission defining the restricted subset of the plurality of address ranges to the policy table and/or may be configured to cause the gate to transition from its OFF state to its ON state. As also described above, the processor 1303 may set lock bits of a logic circuit to prevent any writes to the policy table 1243 and/or to prevent the state of the gate 1241 being changed.

In an example, when the processor 1303 is configured in its second state the processor cannot cause the control unit to transition from its second state to its first state without causing itself to transition to its first state. Therefore, the system 1300 may be regarded as having first and second system states. In the first system state, the processor 1303 and control unit are both in their first states and, in the second system state, the processor 1303 and control unit are both in their second states. Therefore, a single external processor 1303 can be used to, via a single interface 1251, load firmware onto the IC 1250 in addition to having runtime control over the IC 1250, according to these examples.

Figure 14:
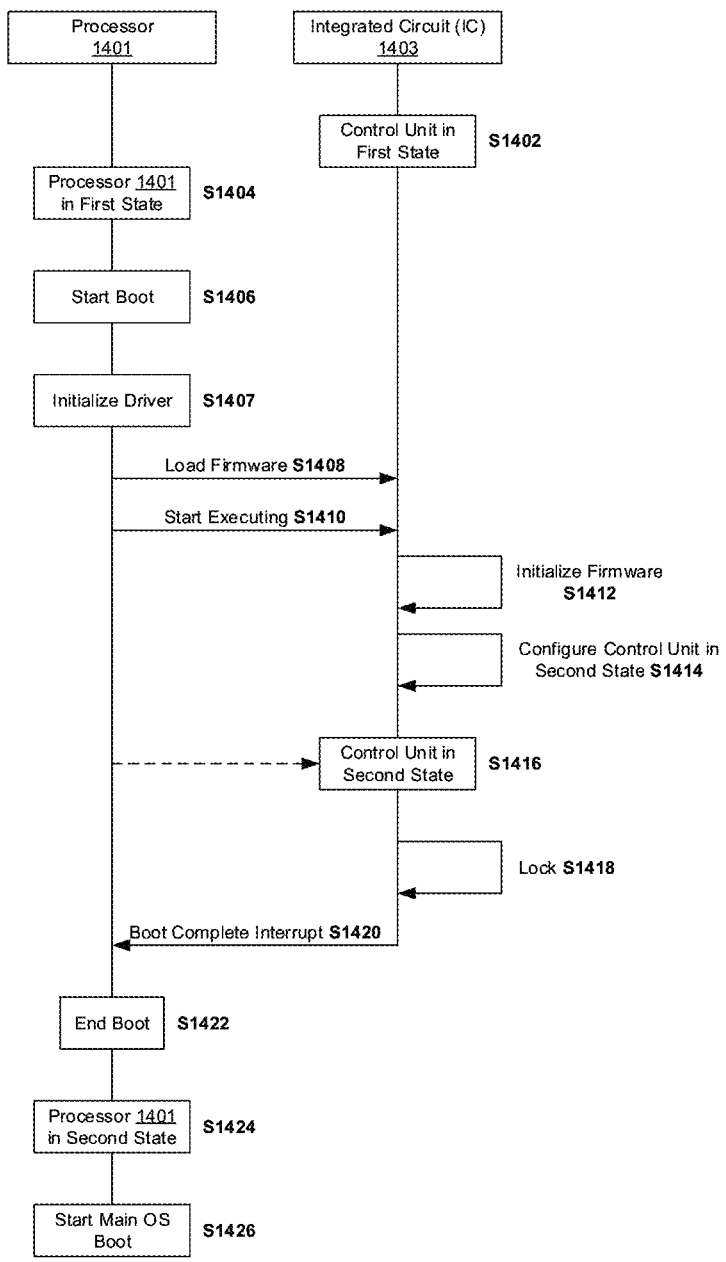
FIG. 14 is a sequence diagram showing an example boot sequence for the integrated circuit of any of the FIG. 11-13 examples.

FIG. 14 is a sequence chart illustrating the flow of an example boot sequence for an integrated circuit. As illustrated in FIG. 14, an integrated circuit 1403 (e.g. the IC 1150 or 1250 as described above) and a processor 1401 (e.g. the processor 1303 as described above) are initially in respective first states (S1402 and S1404), as described above. Therefore, the IC 1403 is configured such that access to its address ranges is unrestricted and the processor 1401 can therefore access all of the address ranges to configure the IC 1403. This proceeds as follows. Boot is commenced and a boot driver of the processor 1401 is initialised (S1406 and S1407). The processor 1401 starts loading firmware into the control registers of the IC 1403 and executing the firmware (S1410). The firmware is initialised by the IC 1403 (S1412). The control unit of the IC 1403 is subsequently configured into its second state (at S1414). As stated above, this may be done by the processor 1401, via the interface of the IC 1401 (e.g. interface 1151, 1251), by configuring the policy table and/or state of the gate (as indicated by the dotted line). At S1416 the control unit (and therefore the IC 1404) is configured in its second state. Access to the address ranges of the IC 1401 is therefore restricted (to a subset) following S1416. The IC 1403 signals to the processor 1401 that it has completed its boot process (S1420), and subsequently the boot process of the processor 1401 ends (S1422). The processor 1401 can then have runtime control of the IC 1401, e.g. for use by a main operating system after it has booted (S1426).

Optionally, at S1418, the configuration of the control unit (and therefore the IC 1404) may be locked, e.g. locked in its second state, as described above, preventing writes to the policy table and/or preventing the state of the gate from being changed (e.g. from ON back to OFF).

FIG. 15 shows another example integrated circuit 1550 which comprises first and second interfaces 1551, 1552. The IC 1550 also comprises an internal addressable space 1559 and a control unit 1540. Each of these components may be as described above with respect to FIGS. 11-14. Each interface 1551, 1552 is coupled to the internal addressable space via the control unit 1540.

The control unit 1540 of the FIG. 15 is configurable in first, second, and third states as will now be described. When the control unit 1540 is configured in the first state, the first interface 1551 has unrestricted access to the plurality of address ranges via the control unit and 1540, and when the control unit 1540 is configured in the second state, the first interface 1551 has access to a restricted subset of the plurality of address ranges via the control unit 1540. In other words, the control unit 1540 is configurable such that a processor may, via only one of the interfaces (interface 1551), have access to the IC 1550 to load and execute firmware and for subsequent runtime control, as described with reference to FIGS. 11-14. However, the control unit 1540 is also configurable in a third state in which the control unit 1540 is configured to allow or deny the second interface 1542 access to a subset of the plurality of address ranges of the internal addressable space 1559 and the first interface 1551 has unrestricted access to the plurality of address ranges. In other words, the control unit 1540 is also configurable via one interface such that the other interface becomes a restricted interface (having access to a subset of the address ranges), as described with reference to FIGS. 1-10.

The control unit 1540 may comprise any of a policy table and/or a gate and/or an audit module as described above with reference to other figures, and configuring the control unit 1540 in any of the first to third states may comprise configuring the policy table and/or changing the state of the gate in a manner described above. The configuration of the control unit 1540 may be set via the first interface 1551 and, when the control unit 1540 is configured in the first state, the control unit 1540 is configurable via the first interface 1551 to be in the second state. The IC 1550 may comprise any of the components as discussed above with reference to other ICs.

It will be appreciated that the IC 1550 of FIG. 15 having first and second interfaces 1551, 1552 is configurable in first and second modes, which are respectively shown in FIGS. 15a and 15b. In the first mode, the first interface 1551 has unrestricted access to the plurality of address ranges, but the IC 1550 is configurable (e.g. as discussed above) such that the first interface 1550 subsequently has restricted access to the plurality of address ranges, the restricted access being restricted to a subset of the plurality of address ranges. In the second mode, the first interface 1551 has unrestricted access to the plurality of address ranges of the internal addressable space and the second interface 1552 has restricted access to the plurality of address ranges, the restricted access being restricted to a subset of the plurality of address ranges.

In other words, in the first mode the IC 1550 is configured as discussed with respect to FIGS. 11-14 above and, in the second mode, the IC 1550 is configured as discussed with respect to FIGS. 1-10 above.

The modes are summarised in the below table:

|  | First interface 1551 | Second Interface 1552 |
|---|---|---|
| First Mode | Initially unrestricted then subsequently restricted | X |
| Second Mode | Unrestricted | Restricted |

The 'X' in the table denotes the state of the second interface 1552 being restricted, unrestricted, even off, or not connected. In other words, the second interface 1552 may not be in use when the IC 1550 is configured in the first mode.

The modes of the IC 1550 may correspond to associated modes of the control unit 1540.

As also discussed above, to configure one of the two interfaces as restricted an associated gate may be switched ON, or an associated policy table may be configured etc.

In another example, the IC 1550 of FIG. 15 has an initial configuration according to which the first interface has unrestricted access to the plurality of address ranges. The IC 1550 may be configurable in a subsequent configuration according to which either the first or the second interface has restricted access to the plurality of address ranges, the restricted access being restricted to a subset of the plurality of address ranges. Put another way, the IC 1550 of FIG. 15 may have an initial configuration according to which the first interface has unrestricted access to the plurality of address ranges but may comprise first and second further configurations according to which the first or second interfaces, respectively, have restricted access to the plurality of address ranges, the restricted access being restricted to a subset of the plurality of address ranges. More specifically, each of the first and second interfaces 1551, 1552 is associated with a respective gate having an ON and an OFF state such that each gate, when in its ON state, permits access to the internal addressable space 1559 according to a policy stored in the integrated circuit. In this example, the first interface 1551 having unrestricted access to the internal addressable space corresponds to the gate associated with the first interface being OFF, and configuring the integrated circuit 1550 such that either the first or the second interface 1551, 1552 has restricted access to the plurality of address ranges, the restricted access being restricted to a subset of the plurality of address ranges, comprises changing the gate associated with either the first or second interface 1551, 1552 from OFF to ON.

This is summarised in the below table, which depicts an initial configuration in which the first interface is unrestricted, but two possible subsequent configurations depending on which of the first and second interfaces becomes restricted.

|  | First interface | Second interface |
|---|---|---|
| Initial Configuration | Unrestricted | X |
| First Subsequent Configuration | Restricted | X |
| Second Subsequent Configuration | Unrestricted | Restricted |

As before, the X denotes the state of the second interface 1552 being restricted, unrestricted, even off, or not connected.

The above table is depicted in FIGS. 16*a-c*, FIG. 16*a* of which depicts the "initial configuration", FIG. 16*b* depicts the "first subsequent configuration" and FIG. 16*c* depicts the "second subsequent configuration."

The IC 1550 therefore can exist in a number of states. According to one such state, the gate associated with the first interface 1551 is OFF and the gate associated with the second interface 1552 is OFF. According to another such state, the gate associated with the first interface 1551 is OFF and the gate associated with the second interface 1552 is ON. According to another such state, the gate associated with the first interface 1551 is ON and the gate associated with the second interface 1552 is OFF.

Features of any given aspect or example may be combined with the features of any other aspect or example and the various features described herein may be implemented in any combination in a given example.

The skilled person will recognise that where applicable the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. An integrated circuit configured to drive an audio transducer, the integrated circuit comprising:
   an internal addressable space comprising a plurality of address ranges wherein the integrated circuit stores an access permission to define an authorized subset of address ranges to which access by an external processor is permitted during runtime control of the integrated circuit; and
   an interface coupled to the internal addressable space, the interface configured to receive an access request, from the external processor, to access at least one of the address ranges of the internal addressable space;

wherein, the integrated circuit is configurable in a first state in which the external processor is permitted, via the interface, access to the plurality of address ranges and in a second state in which the external processor is permitted, via the interface, access to the authorized subset of address ranges and is prevented, via the interface, access to the remainder of the address ranges during runtime control of the integrated circuit;

wherein the integrated circuit comprises a gate having an ON state and an OFF state, wherein the interface is coupled to the internal addressable space via the gate, and wherein, when the integrated circuit is configured in the first state, the gate is configured in the OFF state, and when the integrated circuit is configured in the second state, the gate is configured in the ON state; and wherein, when the integrated circuit is configured in the second state, the state of the gate is prevented from being changed via the interface.

2. The integrated circuit of claim 1, wherein, when the integrated circuit is configured in the first state, the integrated circuit is configurable via the interface to be in the second state.

3. The integrated circuit of claim 1, wherein the integrated circuit comprises a policy table that is configured to store the access permission defining the authorized subset of the plurality of address ranges to which the external processor has access during runtime when the integrated circuit is configured in its second state, and wherein, when the integrated circuit is configured in the first state, the access permission is writable to the policy table, via the interface.

4. The integrated circuit of claim 3, wherein, when the integrated circuit is configured such that, in its second state, modifying the access permission of the policy table, via the interface, is prevented.

5. The integrated circuit of claim 1, wherein, when the integrated circuit is configured in the first state, the state of the gate is settable via the interface.

6. An integrated circuit, configured to drive an audio transducer, the integrated circuit comprising:
   an internal addressable space comprising a plurality of address ranges, wherein the integrated circuit stores an access permission to define an authorized subset of address ranges to which access by an external processor is permitted during runtime control of the integrated circuit; and
   an interface coupled to the internal addressable space, the interface configured to receive an access request, from the external processor, to access at least one of the address ranges of the internal addressable space;
   wherein, the integrated circuit is configurable in a first state in which the external processor is permitted, via the interface, access to the plurality of address ranges and in a second state in which the external processor is permitted, via the interface, access to the authorized subset of address ranges and is prevented, via the interface, access to the remainder of the address ranges during runtime control of the integrated circuit;
   wherein the integrated circuit comprises a gate having an ON state and an OFF state, wherein the interface is coupled to the internal addressable space via the gate, and wherein, when the integrated circuit is configured in the first state, the gate is configured in the OFF state, and when the integrated circuit is configured in the second state, the gate is configured in the ON state; and
   wherein, when the integrated circuit is configured in the second state, the state of the gate is prevented from being changed via the interface; and when the integrated circuit is configured in the second state, the integrated circuit can only be placed in the first state by resetting the integrated circuit.

7. The integrated circuit of claim 1, wherein the authorized subset of the plurality of address ranges excludes configuration registers for the integrated circuit.

8. The integrated circuit of claim 3, further comprising an audit module configured to, for an incoming access request from the external processor, via the interface, to access at least one address of the plurality of address ranges, access the policy table to determine an access permission associated with the at least one address and to transmit a signal to the gate, wherein the gate, when in the ON state, is configured to, on receipt of the signal from the audit module, adopt a configuration according to which the received access request is allowed or denied depending on the access permission associated with the at least one space.

9. An integrated circuit of claim 1, wherein the interface is a first interface, and wherein the integrated circuit comprises a plurality of interfaces including the first interface.

10. A system comprising an integrated circuit configured to drive an audio transducer, the integrated circuit comprising:
    an internal addressable space comprising a plurality of address ranges, wherein the integrated circuit stores an access permission to define an authorized subset of address ranges to which access by an external processor is permitted during runtime control of the integrated circuit; and
    an interface coupled to the internal addressable space, the interface configured to receive an access request, from the external processor, to access at least one of the address ranges of the internal addressable space;
    wherein, the integrated circuit is configurable in a first state in which the external processor is permitted, via the interface, access to the plurality of address ranges and in a second state in which the external processor is permitted, via the interface, access to the authorized subset of address ranges and is prevented, via the interface, access to the remainder of the address ranges during runtime control of the integrated circuit;
    wherein the integrated circuit comprises a gate having an ON state and an OFF state, wherein the interface is coupled to the internal addressable space via the gate, and wherein, when the integrated circuit is configured in the first state, the gate is configured in the OFF state, and when the integrated circuit is configured in the second state, the gate is configured in the ON state;
    wherein, when the integrated circuit is configured in the second state, the state of the gate is prevented from being changed via the interface; and
    wherein the external processor is connected to the interface of the integrated circuit, wherein the external processor comprises a first state and a second state, such that, when configured in the first state, the external processor is configured to execute bootloader firmware and, when configured in the second state, the external processor is configured to initialise and execute an operating system, wherein the external processor being in its first state corresponds to the integrated circuit being in its first state and wherein the external processor being in its second state corresponds to the integrated circuit being in its second state.

11. The system of claim 10, wherein, when configured in the first state, the external processor is configured to load firmware onto the IC that, when executed by the IC, causes the integrated circuit to transition from its first state to its second state.

12. The system of claim 10, wherein, when configured in the first state, the external processor is configured to load firmware onto the IC that, when executed by the IC, writes the access permission defining the authorized subset of the plurality of address ranges to the policy table.

13. The system of claim 10, wherein, when configured in the first state, the external processor is configured to load firmware onto the IC that, when executed by the IC, causes the gate to transition from its OFF state to its ON state.

14. The system of claim 10, wherein, when configured in its second state, the external processor is configured such that it cannot cause the integrated circuit to transition from its second state to its first state without causing itself to transition to its first state.

15. An integrated circuit configured to drive an audio transducer, the integrated circuit comprising:
  an internal addressable space comprising a plurality of address ranges;
  wherein the integrated circuit stores an access permission to define an authorized subset of address ranges to which access by an external processor is permitted during runtime control of the integrated circuit; and
  first and second interfaces coupled to the internal addressable space and wherein each of the first and second interface is configured to receive a request, from the external processor, to access at least one of the address ranges of the internal addressable space;
  the integrated circuit being configurable in first and second modes, wherein:
    in the first mode, the integrated circuit is initially operable in a first state in which the external processor is permitted, via the first interface, access to the plurality of address ranges, and, when in the first mode, and the integrated circuit is configurable to operate in a second state in which the external processor is permitted, via the first interface, access to the authorized subset of address ranges and is prevented, via the first interface, access to the remainder of the address ranges during runtime control of the integrated circuit; and
    in the second mode, the external processor is permitted, via the first interface, access to the plurality of address ranges, and the external processor is permitted, via the second interface, access to the authorized subset of address ranges and is prevented, via the second interface, access to the remainder of the address ranges during runtime control of the integrated circuit.

16. The integrated circuit of claim 15 wherein the integrated circuit is configured in the first mode.

17. The integrated circuit of claim 15 wherein the integrated circuit is configured in the second mode.

18. An integrated circuit configured to drive an audio transducer, the integrated circuit comprising:
  first and second interfaces; and
  an internal addressable space having a plurality of address ranges;
  wherein the integrated circuit stores an access permission to define an authorized subset of address ranges to which access by an external processor is permitted during runtime control of the integrated circuit;
  wherein each of the first and second interfaces is coupled to the internal addressable space and wherein each of the first and second interfaces is configured to receive a request, from the external processor, to access at least one of the address ranges of the internal addressable space; and
  wherein the integrated circuit is initially operable in a first state in which the external processor is permitted, via the first interface, access to the plurality of address ranges, and wherein the integrated circuit is configurable to operate in a selected one of a second state and a third state in which, in the second state the external processor is permitted access to the authorized subset of address ranges via the first interface and is prevented access to the remainder of the address ranges via the first interface during runtime control of the integrated circuit, and in the third state the external processor is permitted access to the plurality of address ranges via the first interface and is permitted access to the authorized subset of address ranges via the second interface and is prevented access to the remainder of the address ranges via the second interface during runtime control of the integrated circuit.

19. The integrated circuit of claim 18, wherein each of the first and second interfaces is associated with a respective gate having an ON and an OFF state such that each gate, when in its ON state, permits access to the internal addressable space according to a policy stored in the integrated circuit;
  wherein the external processor being permitted, via the first interface, access to the plurality of address ranges corresponds to the gate associated with the first interface being OFF;
  wherein configuring the integrated circuit such that the external processor, via either the first or the second interface, is permitted access to the authorized subset of address ranges and is prevented access to the remainder of address ranges during runtime, comprises changing the gate associated with either the first or second interface from OFF to ON.

20. The integrated circuit of claim 19 wherein the gate associated with the first interface is OFF and the gate associated with the second interface is OFF.

21. The integrated circuit of claim 19 wherein the gate associated with the first interface is OFF and the gate associated with the second interface is ON.

22. The integrated circuit of claim 19 wherein the gate associated with the first interface is ON and the gate associated with the second interface is OFF.

* * * * *